US012662624B2

(12) United States Patent (10) Patent No.: US 12,662,624 B2
Shirley et al. (45) Date of Patent: Jun. 23, 2026

(54) METHODS FOR PERFORMING REFRACTURING OPERATIONS USING COKE PROPPANT PARTICLES

(71) Applicant: ExxonMobil Technology and Engineering Company, Spring, TX (US)

(72) Inventors: Robert M. Shirley, The Woodlands, TX (US); James S. Brown, Sugar Land, TX (US); P. Matthew Spiecker, Manvel, TX (US); Mohan G. Kulkarni, The Woodlands, TX (US); Timothy G. Benish, Spring, TX (US); Roman Galchenko, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/675,647

(22) Filed: May 28, 2024

(65) Prior Publication Data

US 2025/0236785 A1 Jul. 24, 2025

Related U.S. Application Data

(63) Continuation-in-part of application No. 18/417,478, filed on Jan. 19, 2024, now abandoned, and a
(Continued)

(51) Int. Cl.
C09K 8/80 (2006.01)
C09K 8/66 (2006.01)
E21B 43/267 (2006.01)

(52) U.S. Cl.
CPC .................. *C09K 8/80* (2013.01); *C09K 8/66* (2013.01); *E21B 43/267* (2013.01)

(58) Field of Classification Search
CPC ...... E21B 43/261; E21B 43/267; E21B 43/27; C09K 8/66; C09K 8/80
See application file for complete search history.

(56) References Cited

U.S. PATENT DOCUMENTS

| | | | |
|---|---|---|---|
| 1,754,765 | A | 4/1930 | Parr et al. |
| 3,089,542 | A | 5/1963 | Kolodny |

(Continued)

FOREIGN PATENT DOCUMENTS

| | | | |
|---|---|---|---|
| CA | 684454 A | 4/1964 | |
| CA | 2863283 A1 | 3/2015 | |

(Continued)

OTHER PUBLICATIONS

A. Abrams, "Mud Design to Minimize Rock Impairment Due to Particle Invasion", J Pet Technol 29 (05): 586-592, May 1, 1977.
(Continued)

*Primary Examiner* — Matthew R Buck
(74) *Attorney, Agent, or Firm* — Troutman Pepper Locke LLP; John Morrissett; Scott A. Bergeson

(57) ABSTRACT

A method for performing a refracturing operation using coke proppant particles comprises refracturing a subterranean formation that has been previously hydraulically fractured with respect to a hydrocarbon well by injecting a fracturing fluid comprising a carrier fluid and coke proppant particles into the subterranean formation via a wellbore of the hydrocarbon well.

28 Claims, 4 Drawing Sheets

Related U.S. Application Data continuation-in-part of application No. 18/417,483, filed on Jan. 19, 2024, now abandoned, and a continuation-in-part of application No. 18/417,488, filed on Jan. 19, 2024, now abandoned, and a continuation-in-part of application No. 18/417,492, filed on Jan. 19, 2024, now abandoned, and a continuation-in-part of application No. 18/417,433, filed on Jan. 19, 2024, now abandoned.

(56) References Cited

U.S. PATENT DOCUMENTS

| | | | |
|---|---|---|---|
| 3,283,817 A | | 11/1966 | Roberts |
| 3,659,651 A | * | 5/1972 | Graham ............... E21B 43/267 |
| | | | 507/924 |
| 3,661,543 A | | 5/1972 | Saxton |
| 3,664,420 A | * | 5/1972 | Graham .................. C09K 8/80 |
| | | | 166/280.2 |
| 3,700,032 A | * | 10/1972 | Terry ..................... E21B 43/26 |
| | | | 166/308.1 |
| 3,702,516 A | | 11/1972 | Luckenbach |
| 3,759,676 A | | 9/1973 | Lahn |
| 3,816,084 A | | 6/1974 | Moser et al. |
| 4,036,750 A | | 7/1977 | Jaros et al. |
| 4,269,696 A | | 5/1981 | Metrailer |
| 4,741,840 A | | 5/1988 | Atherton et al. |
| 4,796,701 A | | 1/1989 | Hudson et al. |
| 4,957,174 A | | 9/1990 | Whitfill et al. |
| 5,189,102 A | | 2/1993 | Tsubuko et al. |
| 5,215,143 A | | 6/1993 | Gentry |
| 5,604,184 A | | 2/1997 | Ellis et al. |
| 5,889,137 A | | 3/1999 | Hutchings et al. |
| 5,899,272 A | | 5/1999 | Loree |
| 6,016,879 A | | 1/2000 | Burts, Jr. |
| 6,035,936 A | | 3/2000 | Whalen |
| 6,059,034 A | | 5/2000 | Rickards et al. |
| 6,283,212 B1 | | 9/2001 | Hinkel et al. |
| 6,330,916 B1 | | 12/2001 | Rickards et al. |
| 6,720,290 B2 | | 4/2004 | England et al. |
| 6,825,152 B2 | | 11/2004 | Green |
| 7,073,581 B2 | | 7/2006 | Nguyen et al. |
| 7,210,528 B1 | | 5/2007 | Brannon et al. |
| 7,237,609 B2 | | 7/2007 | Nguyen |
| 7,249,500 B2 | | 7/2007 | Dutton et al. |
| 7,255,169 B2 | | 8/2007 | van Batenburg et al. |
| 7,270,879 B2 | | 9/2007 | McCrary |
| 7,325,608 B2 | | 2/2008 | van Batenburg et al. |
| 7,334,635 B2 | | 2/2008 | Nguyen |
| 7,337,839 B2 | | 3/2008 | Ayoub et al. |
| 7,424,911 B2 | | 9/2008 | McCarthy et al. |
| 7,450,053 B2 | | 11/2008 | Funk et al. |
| 7,472,751 B2 | | 1/2009 | Brannon et al. |
| 7,494,711 B2 | | 2/2009 | Kaufman et al. |
| 7,521,389 B2 | | 4/2009 | Shmotev et al. |
| 7,527,097 B2 | | 5/2009 | Patel |
| 7,528,096 B2 | | 5/2009 | Brannon et al. |
| 7,541,318 B2 | | 6/2009 | Weaver et al. |
| 7,568,524 B2 | | 8/2009 | Blackburn et al. |
| 7,598,898 B1 | | 10/2009 | Funk et al. |
| 7,612,021 B2 | | 11/2009 | Chatterji et al. |
| 7,648,934 B2 | | 1/2010 | Shmotev et al. |
| 7,669,657 B2 | | 3/2010 | Symington et al. |
| 7,699,106 B2 | | 4/2010 | Brannon et al. |
| 7,703,531 B2 | | 4/2010 | Huang et al. |
| 7,721,803 B2 | | 5/2010 | Huang et al. |
| 7,726,399 B2 | | 6/2010 | Brannon et al. |
| 7,727,940 B2 | | 6/2010 | Reddy et al. |
| 7,735,556 B2 | | 6/2010 | Misselbrook et al. |
| 7,772,163 B1 | | 8/2010 | Brannon et al. |
| 7,789,147 B2 | | 9/2010 | Brannon et al. |
| 7,790,656 B2 | | 9/2010 | Windebank et al. |
| 7,825,053 B2 | | 11/2010 | Duenckel et al. |
| 7,833,947 B1 | | 11/2010 | Kubala |
| 7,841,411 B2 | | 11/2010 | Fuller et al. |
| 7,900,702 B2 | | 3/2011 | Reddy et al. |
| 7,918,277 B2 | | 4/2011 | Brannon et al. |
| 7,954,548 B2 | | 6/2011 | Curimbaba et al. |
| 7,971,644 B2 | | 7/2011 | Ladva et al. |
| 8,003,214 B2 | | 8/2011 | Rediger et al. |
| 8,006,755 B2 | | 8/2011 | Bicerano |
| 8,058,213 B2 | | 11/2011 | Rediger et al. |
| 8,061,427 B2 | | 11/2011 | Jackson et al. |
| 8,063,000 B2 | | 11/2011 | Wilson |
| 8,082,994 B2 | | 12/2011 | Nguyen et al. |
| 8,091,637 B2 | | 1/2012 | Fripp |
| 8,104,537 B2 | | 1/2012 | Kaminsky |
| 8,113,283 B2 | | 2/2012 | Welton et al. |
| 8,127,844 B2 | | 3/2012 | Luharuka et al. |
| 8,127,849 B2 | | 3/2012 | Gupta |
| 8,127,850 B2 | | 3/2012 | Brannon et al. |
| 8,167,043 B2 | | 5/2012 | Willberg et al. |
| 8,178,477 B2 | | 5/2012 | Skala et al. |
| 8,227,026 B2 | | 7/2012 | McDaniel et al. |
| 8,236,737 B2 | | 8/2012 | Fan et al. |
| 8,240,383 B2 | | 8/2012 | Xu et al. |
| 8,281,857 B2 | | 10/2012 | Willberg et al. |
| 8,291,978 B2 | | 10/2012 | Hutchins et al. |
| 8,327,940 B2 | | 12/2012 | Boronin et al. |
| 8,354,939 B2 | | 1/2013 | McDaniel et al. |
| 8,360,149 B2 | | 1/2013 | Hughes et al. |
| 8,361,373 B1 | | 1/2013 | Byron |
| 8,420,578 B2 | | 4/2013 | Usova et al. |
| 8,459,353 B2 | | 6/2013 | Hughes et al. |
| 8,496,057 B2 | | 7/2013 | Ferrero et al. |
| 8,540,024 B2 | | 9/2013 | Kosarev et al. |
| 8,584,755 B2 | | 11/2013 | Willberg et al. |
| 8,596,355 B2 | | 12/2013 | Kaminsky et al. |
| 8,596,361 B2 | | 12/2013 | Willberg et al. |
| 8,596,362 B2 | | 12/2013 | Nelson |
| 8,603,578 B2 | | 12/2013 | Smith et al. |
| 8,607,870 B2 | | 12/2013 | Gu et al. |
| 8,613,314 B2 | | 12/2013 | Garcia-Lopez de Victoria et al. |
| 8,614,157 B2 | | 12/2013 | Pope et al. |
| 8,701,774 B2 | | 4/2014 | Johnson, Sr. |
| 8,739,878 B2 | | 6/2014 | Brannon et al. |
| 8,770,294 B2 | | 7/2014 | Tanguay et al. |
| 8,772,207 B2 | | 7/2014 | Geary et al. |
| 8,869,888 B2 | | 10/2014 | Cramer et al. |
| 8,931,553 B2 | | 1/2015 | Cannan et al. |
| 8,936,083 B2 | | 1/2015 | Nguyen |
| 8,944,164 B2 | | 2/2015 | Veldman et al. |
| 8,959,954 B2 | | 2/2015 | Koseski et al. |
| 8,960,284 B2 | | 2/2015 | Nguyen et al. |
| 8,978,764 B2 | | 3/2015 | Dusseault et al. |
| 8,993,489 B2 | | 3/2015 | McDaniel et al. |
| 9,010,424 B2 | | 4/2015 | Agrawal et al. |
| 9,023,770 B2 | | 5/2015 | Todd et al. |
| 9,080,441 B2 | | 7/2015 | Meurer et al. |
| 9,091,161 B2 | | 7/2015 | Brannon |
| 9,096,790 B2 | | 8/2015 | McCrary et al. |
| 9,097,097 B2 | | 8/2015 | DiFoggio et al. |
| 9,102,867 B2 | | 8/2015 | Parse et al. |
| 9,109,992 B2 | | 8/2015 | Wang |
| 9,140,118 B2 | | 9/2015 | Kulkarni et al. |
| 9,145,513 B2 | | 9/2015 | Pershikova et al. |
| 9,175,210 B2 | | 11/2015 | Eldred et al. |
| 9,175,529 B2 | | 11/2015 | Jamison et al. |
| 9,228,041 B2 | | 1/2016 | Martinez-Castro et al. |
| 9,234,127 B2 | | 1/2016 | De Paiva Cortes et al. |
| 9,234,415 B2 | | 1/2016 | Hughes et al. |
| 9,243,491 B2 | | 1/2016 | McDaniel et al. |
| 9,290,689 B2 | | 3/2016 | Lafitte et al. |
| 9,291,045 B2 | | 3/2016 | Wheeler et al. |
| 9,315,719 B2 | | 4/2016 | Fang et al. |
| 9,322,269 B2 | | 4/2016 | Matherly et al. |
| 9,353,613 B2 | | 5/2016 | Soliman et al. |
| 9,388,334 B2 | | 7/2016 | Hughes et al. |
| 9,458,710 B2 | | 10/2016 | Makarychev-Mikhailov et al. |
| 9,523,268 B2 | | 12/2016 | Potapenko et al. |
| 9,556,376 B2 | | 1/2017 | Huang et al. |
| 9,574,130 B2 | | 2/2017 | Gupta |
| 9,611,423 B2 | | 4/2017 | Zhang et al. |
| 9,631,137 B2 | | 4/2017 | Fuss et al. |

(56)  References Cited

U.S. PATENT DOCUMENTS

| | | | |
|---|---|---|---|
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 * | 3/2020 | Sen ........................ E21B 43/267 |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,015,437 B2 | 5/2021 | Zhang et al. |
| 11,021,649 B2 | 6/2021 | Bai et al. |
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |

(56)             References Cited

U.S. PATENT DOCUMENTS

| | | | |
|---|---|---|---|
| 11,180,691 B2 | 11/2021 | Sodhi et al. | |
| 11,230,660 B2 | 1/2022 | Nguyen et al. | |
| 11,236,599 B2 | 2/2022 | Nguyen et al. | |
| 11,254,857 B2 | 2/2022 | Cox et al. | |
| 11,255,176 B2 | 2/2022 | Nguyen et al. | |
| 11,274,243 B2 | 3/2022 | Siddiqui et al. | |
| 11,280,172 B2 | 3/2022 | Peng et al. | |
| 11,313,211 B2 | 4/2022 | Johnson | |
| 11,313,214 B2 | 4/2022 | Nguyen et al. | |
| 11,319,482 B2 | 5/2022 | Rahy et al. | |
| 11,326,088 B2 | 5/2022 | Todd | |
| 11,339,323 B2 | 5/2022 | Roper et al. | |
| 11,345,848 B2 | 5/2022 | Khamatnurova et al. | |
| 11,352,551 B2 | 6/2022 | Agrawal et al. | |
| 11,365,341 B2 | 6/2022 | Patil et al. | |
| 11,377,581 B2 | 7/2022 | Belakshe et al. | |
| 11,377,944 B2 | 7/2022 | Santra et al. | |
| 11,396,800 B2 | 7/2022 | Madasu et al. | |
| 11,407,932 B2 | 8/2022 | Deysarkar et al. | |
| 11,408,281 B2 | 8/2022 | Lu et al. | |
| 11,414,974 B2 | 8/2022 | Entchev et al. | |
| 11,427,753 B2 | 8/2022 | Ortega Andrade et al. | |
| 11,428,087 B2 | 8/2022 | Nguyen et al. | |
| 11,428,839 B2 | 8/2022 | Mukherjee | |
| 11,434,740 B1 | 9/2022 | Nguyen et al. | |
| 11,441,406 B2 | 9/2022 | Nguyen et al. | |
| 11,447,690 B2 | 9/2022 | Nguyen et al. | |
| 11,447,693 B2 | 9/2022 | Jenkins et al. | |
| 11,459,500 B2 | 10/2022 | Khamatnurova et al. | |
| 11,465,155 B1 | 10/2022 | Mitchell et al. | |
| 11,466,201 B2 | 10/2022 | Smith, Jr. et al. | |
| 11,485,901 B2 | 11/2022 | Shen et al. | |
| 11,486,241 B2 | 11/2022 | Nelson et al. | |
| 11,492,543 B2* | 11/2022 | Gordon | C09K 8/80 |
| 11,506,584 B2 | 11/2022 | Martysevich et al. | |
| 11,512,025 B2 | 11/2022 | Eldred et al. | |
| 11,535,588 B2 | 12/2022 | Favero et al. | |
| 11,536,125 B1 | 12/2022 | Yang et al. | |
| 11,560,776 B2 | 1/2023 | Madasu | |
| 11,566,488 B2 | 1/2023 | Brandl et al. | |
| 11,566,504 B2 | 1/2023 | Perez et al. | |
| 11,568,111 B2 | 1/2023 | Zhou et al. | |
| 11,578,262 B2 | 2/2023 | Gordon et al. | |
| 11,590,469 B2 | 2/2023 | Cho et al. | |
| 11,591,903 B2 | 2/2023 | Mukherjee | |
| 11,597,872 B2 | 3/2023 | Conkle | |
| 11,608,724 B2 | 3/2023 | Chopade et al. | |
| 11,608,740 B2 | 3/2023 | Moos et al. | |
| 11,613,691 B1 | 3/2023 | Pollock | |
| 11,613,989 B2 | 3/2023 | Zhang et al. | |
| 11,629,284 B1 | 4/2023 | Saini et al. | |
| 11,629,581 B2 | 4/2023 | Cook | |
| 11,643,592 B1 | 5/2023 | Saini et al. | |
| 11,649,398 B1 | 5/2023 | AlTammar et al. | |
| 11,656,002 B2 | 5/2023 | Nevison et al. | |
| 11,661,842 B2 | 5/2023 | Dalamarinis et al. | |
| 11,667,831 B2 | 6/2023 | Liang et al. | |
| 11,667,832 B2 | 6/2023 | Saini et al. | |
| 11,674,074 B2 | 6/2023 | Sherman | |
| 11,692,127 B2 | 7/2023 | Dawson et al. | |
| 11,692,424 B2 | 7/2023 | Nguyen et al. | |
| 11,697,759 B1 | 7/2023 | Dusterhoft et al. | |
| 11,697,760 B2 | 7/2023 | Stover et al. | |
| 11,702,587 B2 | 7/2023 | Li et al. | |
| 11,702,588 B1 | 7/2023 | Saini et al. | |
| 11,713,414 B1 | 8/2023 | Dobson et al. | |
| 11,732,179 B2 | 8/2023 | Vidma et al. | |
| 11,753,584 B2 | 9/2023 | Mazrooee et al. | |
| 11,753,919 B2 | 9/2023 | Velikanov et al. | |
| 11,753,923 B2 | 9/2023 | Dalamarinis | |
| 11,767,466 B2 | 9/2023 | Santra et al. | |
| 11,781,062 B1 | 10/2023 | Liu et al. | |
| 11,781,412 B2 | 10/2023 | Zhang et al. | |
| 11,814,923 B2 | 11/2023 | Sherman et al. | |
| 11,827,845 B2 | 11/2023 | Vigderman et al. | |
| 11,840,911 B2 | 12/2023 | Fan et al. | |
| 11,845,895 B2 | 12/2023 | Montalvo et al. | |
| 11,859,129 B2 | 1/2024 | Uddenburg et al. | |
| 11,859,489 B2 | 1/2024 | Werry et al. | |
| 11,876,398 B1 | 1/2024 | Heath et al. | |
| 11,965,677 B2 | 4/2024 | Cook et al. | |
| 12,037,894 B2 | 7/2024 | Zhang et al. | |
| 2001/0001308 A1 | 5/2001 | Varadaraj et al. | |
| 2004/0014824 A1 | 1/2004 | Leinweber et al. | |
| 2004/0040708 A1 | 3/2004 | Stephenson et al. | |
| 2005/0244641 A1 | 11/2005 | Vincent | |
| 2005/0274523 A1 | 12/2005 | Brannon et al. | |
| 2006/0073980 A1 | 4/2006 | Brannon et al. | |
| 2006/0175059 A1 | 8/2006 | Sinclair et al. | |
| 2006/0272816 A1 | 12/2006 | Willberg et al. | |
| 2008/0135246 A1 | 6/2008 | Canova et al. | |
| 2008/0156489 A1 | 7/2008 | Pershikova et al. | |
| 2009/0038797 A1 | 2/2009 | Skala et al. | |
| 2009/0038799 A1 | 2/2009 | Garcia-Lopez de Victoria et al. | |
| 2009/0075847 A1 | 3/2009 | Wawrzos et al. | |
| 2009/0283447 A1 | 11/2009 | D'Elia et al. | |
| 2010/0179077 A1 | 7/2010 | Turakhia et al. | |
| 2010/0263865 A1 | 10/2010 | Willberg et al. | |
| 2011/0082033 A1 | 4/2011 | Frohs et al. | |
| 2011/0111990 A1 | 5/2011 | Pershikova et al. | |
| 2011/0118155 A1 | 5/2011 | Pisklak et al. | |
| 2012/0043080 A1 | 2/2012 | Edwards | |
| 2012/0088699 A1 | 4/2012 | Qin | |
| 2012/0241168 A1 | 9/2012 | Pei et al. | |
| 2012/0267102 A1 | 10/2012 | Huang et al. | |
| 2013/0025867 A1 | 1/2013 | Sun et al. | |
| 2014/0014338 A1 | 1/2014 | Crews et al. | |
| 2014/0096952 A1* | 4/2014 | Hocking | E21B 43/267 |
| | | | 166/248 |
| 2014/0196898 A1 | 7/2014 | Tanguay et al. | |
| 2014/0209390 A1 | 7/2014 | Jamison et al. | |
| 2014/0353042 A1 | 12/2014 | Karale et al. | |
| 2015/0167437 A1 | 6/2015 | Dawson | |
| 2015/0211346 A1 | 7/2015 | Potapenko et al. | |
| 2015/0233226 A1 | 8/2015 | Holzhauser et al. | |
| 2015/0247084 A1 | 9/2015 | Epstein | |
| 2015/0292279 A1 | 10/2015 | Wang | |
| 2015/0361331 A1 | 12/2015 | Tanguay et al. | |
| 2016/0137910 A1 | 5/2016 | Chang et al. | |
| 2016/0215205 A1 | 7/2016 | Nguyen et al. | |
| 2016/0319185 A1 | 11/2016 | Semenov et al. | |
| 2016/0326300 A1 | 11/2016 | Gelves et al. | |
| 2016/0340573 A1 | 11/2016 | Semenov et al. | |
| 2017/0145302 A1 | 5/2017 | Qin et al. | |
| 2017/0198209 A1 | 7/2017 | Stephenson et al. | |
| 2017/0321105 A1 | 11/2017 | McDaniel et al. | |
| 2018/0066179 A1 | 3/2018 | Nguyen et al. | |
| 2018/0282222 A1 | 10/2018 | Khan | |
| 2018/0339946 A1 | 11/2018 | Öttinger et al. | |
| 2019/0016944 A1 | 1/2019 | Eldred et al. | |
| 2019/0048146 A1 | 2/2019 | Dei Santi et al. | |
| 2019/0112520 A1 | 4/2019 | Knoer et al. | |
| 2019/0241789 A1 | 8/2019 | Agapiou et al. | |
| 2019/0330520 A1 | 10/2019 | Cannan et al. | |
| 2020/0131431 A1 | 4/2020 | Russum | |
| 2020/0157415 A1 | 5/2020 | Quintero et al. | |
| 2020/0208047 A1 | 7/2020 | Gordon et al. | |
| 2020/0306710 A1 | 10/2020 | Cho et al. | |
| 2020/0370405 A1 | 11/2020 | Nguyen et al. | |
| 2021/0002994 A1 | 1/2021 | Zhou et al. | |
| 2021/0087459 A1 | 3/2021 | Patil et al. | |
| 2021/0131261 A1* | 5/2021 | Wang | E21B 49/006 |
| 2021/0207465 A1 | 7/2021 | Nguyen et al. | |
| 2021/0229049 A1 | 7/2021 | Mazrooee et al. | |
| 2021/0246364 A1* | 8/2021 | Gordon | E21B 43/267 |
| 2021/0253943 A1 | 8/2021 | Ghosh et al. | |
| 2021/0253944 A1 | 8/2021 | Gordon et al. | |
| 2021/0317733 A1 | 10/2021 | Downey | |
| 2021/0340432 A1 | 11/2021 | Bhaduri et al. | |
| 2022/0090475 A1 | 3/2022 | Radwan | |
| 2022/0112422 A1 | 4/2022 | Liang et al. | |
| 2022/0169915 A1 | 6/2022 | Barron et al. | |
| 2022/0186605 A1 | 6/2022 | Quan et al. | |
| 2022/0340809 A1 | 10/2022 | Li et al. | |

(56) References Cited

U.S. PATENT DOCUMENTS

| | | |
|---|---|---|
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1 | 5/2023 | Decker |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |

FOREIGN PATENT DOCUMENTS

| | | | | |
|---|---|---|---|---|
| CN | 203319922 U | 12/2013 | | |
| CN | 109236262 A | 8/2020 | | |
| CN | 109751029 B | 10/2021 | | |
| PL | 234113 B1 | 3/2018 | | |
| PL | 234114 B1 | 11/2018 | | |
| WO | 2007141519 A2 | 12/2007 | | |
| WO | 2008033225 A2 | 3/2008 | | |
| WO | 2011163529 A1 | 12/2011 | | |
| WO | 2012040025 A2 | 3/2012 | | |
| WO | 2012051026 A2 | 4/2012 | | |
| WO | 2012104582 A1 | 8/2012 | | |
| WO | 2013059793 A2 | 4/2013 | | |
| WO | 2013119507 A1 | 8/2013 | | |
| WO | 2013158308 A1 | 10/2013 | | |
| WO | 2013176977 A1 | 11/2013 | | |
| WO | 2014039968 A1 | 3/2014 | | |
| WO | 2014172953 A1 | 10/2014 | | |
| WO | 2014172955 A1 | 10/2014 | | |
| WO | 2015021523 A1 | 2/2015 | | |
| WO | 2015031415 A2 | 3/2015 | | |
| WO | 2015041690 A1 | 3/2015 | | |
| WO | 2016033533 A1 | 3/2016 | | |
| WO | 2016054022 A1 | 4/2016 | | |
| WO | 2016074075 A1 | 5/2016 | | |
| WO | 2016168719 A1 | 10/2016 | | |
| WO | 2018001748 A1 | 1/2018 | | |
| WO | 2018094123 A1 | 5/2018 | | |
| WO | 2019164694 A1 | 8/2019 | | |
| WO | 2019199431 A1 | 10/2019 | | |
| WO | 2019/222034 A1 | 11/2019 | | |
| WO | 2020131122 A1 | 6/2020 | | |
| WO | 2020139472 A1 | 7/2020 | | |
| WO | 2020185373 A1 | 9/2020 | | |
| WO | 2021030287 A1 | 2/2021 | | |
| WO | 2022232715 A1 | 11/2022 | | |
| WO | WO-2022241338 A1 * | 11/2022 | .............. | C09K 8/68 |
| WO | WO-2022241339 A1 * | 11/2022 | .............. | C09K 8/62 |
| WO | 2023040535 A1 | 3/2023 | | |
| WO | 2024131192 A1 | 6/2024 | | |

OTHER PUBLICATIONS

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexi-coking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access the concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)-Coke Composites Prepared by Mechanical Alloying Technique", XP055926292, DOI: 10.20944/preprints201608. 0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

(56) References Cited

OTHER PUBLICATIONS

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating to Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

* cited by examiner

METHODS FOR PERFORMING REFRACTURING OPERATIONS USING COKE PROPPANT PARTICLES

CROSS-REFERENCE TO RELATED APPLICATION

This application claims priority to and the benefit of and commonly-assigned U.S. patent application Ser. No. 18/417,433, filed Jan. 19, 2024, titled "HYDRAULIC FRACTURING FLUID COMPRISING MICROPROPPANT COKE PARTICLES, METHOD FOR MAKING SAME, AND HYDRAULIC FRACTURING PROCESSES USING SAME," and commonly-assigned U.S. patent application Ser. No. 18/417,478, filed Jan. 19, 2024, titled "METHODS FOR PERFORMING REFRACTURING OPERATIONS USING COKE PROPPANT PARTICLES," and commonly-assigned U.S. patent application Ser. No. 18/417,492, filed Jan. 19, 2024, titled "PROPPANT PARTICLES FORMED FROM FLUID COKE AND FLEXICOKE, FRACTURING FLUIDS COMPRISING SUCH PROPPANT PARTICLES, AND METHODS RELATED THERETO," and commonly-assigned U.S. patent application Ser. No. 18/417,488, filed Jan. 19, 2024, titled "HYDRAULIC FRACTURING METHODS UTILIZING COKE PROPPANT PARTICLES," and and commonly-assigned U.S. patent application Ser. No. 18/417,483, filed Jan. 19, 2024, titled "METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING," the contents of all of which are incorporated by reference herein in their entirety.

FIELD

This disclosure relates generally to the fields of hydraulic fracturing operations and proppant particles employed therein. More specifically, this disclosure relates to methods for performing refracturing operations using coke proppant particles.

BACKGROUND

This section is intended to introduce various aspects of the art, which may be associated with aspects and embodiments of the present disclosure. This discussion is believed to assist in providing a framework to facilitate a better understanding of particular aspects and embodiments of the present disclosure. Accordingly, it should be understood that this section should be read in this light, and not necessarily as admissions of prior art.

When a hydrocarbon well experiences a decline in production performance, a refracturing operation is sometimes performed to extend the productive lifetime of the hydrocarbon well. Such refracturing operation may include restimulating the hydrocarbon well to reopen and/or extend the initial hydraulic fractures that have fully or partially closed due to proppant embedment and/or proppant degradation. Such refracturing operation may also include recompleting at least a portion of the wellbore to create new perforations and new corresponding hydraulic fractures within areas of the subterranean formation that were previously bypassed or under-stimulated.

However, the success of such refracturing operation is typically limited due to the utilization of the same types of proppants that contributed to the initial decline in production. In particular, such proppants (which typically include non-coke proppants, such as sand, crushed granite, and/or ceramic beads) have limited ability to penetrate deeply into previously-unreached and/or under-stimulated areas of the subterranean formation and instead have a tendency to settle within near-wellbore regions of the subterranean formation, which may have already been effectively drained via the initial hydraulic fractures. Therefore, there is a genuine need of high-performance proppants, hydraulic fracturing fluids, and refracturing methods in the industry. This disclosure satisfies these and other needs.

SUMMARY

An aspect of the present disclosure provides a method that includes refracturing a subterranean formation that has been previously hydraulically fractured with respect to a hydrocarbon well by injecting a fracturing fluid including a carrier fluid and coke proppant particles into the subterranean formation via a wellbore of the hydrocarbon well.

Another aspect of the present disclosure provides a hydrocarbon well including a wellbore that extends within a subterranean formation, a production casing string that extends within at least a portion of the wellbore, perforations formed within the production casing string, hydraulic fractures formed in the subterranean formation proximate to the perforations, and coke proppant particles positioned within at least a portion of the hydraulic fractures. At least a portion of the hydraulic fractures have been restimulated via an injection of a fracturing fluid including a carrier fluid and the coke proppant particles into the subterranean formation via at least a portion of the perforations, and the restimulation of the at least the portion of the hydraulic fractures was performed subsequent to an initial hydraulic fracturing of the subterranean formation.

Another aspect of the present disclosure provides a hydrocarbon well including a wellbore that extends within a subterranean formation, a production casing string that extends within at least a portion of the wellbore, perforations formed within the production casing string, hydraulic fractures formed in the subterranean formation proximate to the perforations, and coke proppant particles positioned within at least a portion of the hydraulic fractures. At least a portion of the perforations include new perforations formed within the production casing string subsequent to an initial hydraulic fracturing of the subterranean formation, and at least a portion of the hydraulic fractures include new hydraulic fractures formed via an injection of a fracturing fluid including a carrier fluid and the coke proppant particles into the subterranean formation via at least a portion of the new perforations.

Another aspect of the present disclosure provides a hydrocarbon well including a wellbore that extends within a subterranean formation, a pre-existing production casing string that extends within at least a portion of the wellbore, and a new production casing string that extends within at least a portion of the pre-existing production casing string, where the new production casing string was provided within the wellbore subsequent to an initial hydraulic fracturing of the subterranean formation via the pre-existing production casing string. The hydrocarbon well also includes new perforations formed within the new production casing string, new hydraulic fractures formed in the subterranean formation proximate to the new perforations, and coke proppant particles positioned within at least a portion of the new hydraulic fractures.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where.

Figure 1:
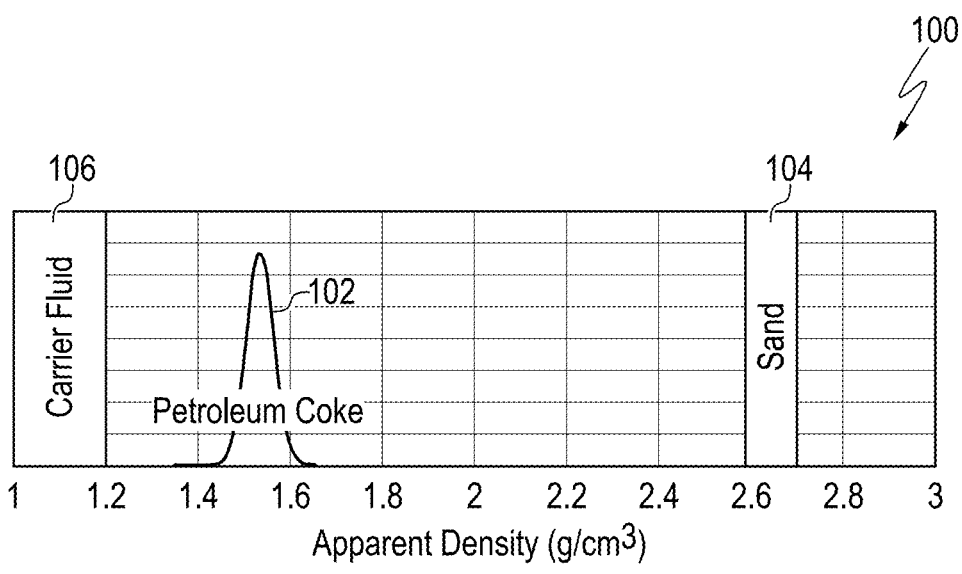
FIG. 1 is a graph comparing the apparent densities of petroleum coke particles within a petroleum coke sample to the apparent densities of sand particles within a sand sample.

It should be noted that the figures are merely examples of the present disclosure and are not intended to impose limitations on the scope of the present disclosure. Further, the figures are generally not drawn to scale, but are drafted for purposes of convenience and clarity in illustrating various aspects of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., +1%, +5%, +10%, +15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particles, refers to the density of the individual particles themselves, which may be expressed in grams per cubic centimeter (g/cm$^3$ or g/cc). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation.

For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "blast furnace coke" refers to any coal-derived coke suitable for use in a blast furnace for making steel.

As used herein, the term "crush strength," when used with reference to proppant particles, refers to the uniaxial stress (compressive) load that the proppant particles can withstand prior to crushing (e.g., breaking or cracking). The crush strength values of the present disclosure are based on API RP-19C.

As used herein, the term "delayed coke" refers to the solid concentrated carbon material that is produced within delayed coking units via the delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which can have an outlet temperature of, e.g., around 895° F. to around 960° F. Exemplary outlet temperature ranges include around 900° F. to around 910° F., around 910° F. to around 920° F., around 920° F. to around 930° F., around 930° F. to around 940° F., around 940° F. to around 950° F., and around 950° F. to around 960° F., to name a few non-limiting examples. The heated feedstock then enters a reactor, often referred to as a "coke drum," which can operate at temperatures of, e.g., around 780° F. to around 840° F. Exemplary ranges of reactor temperature include around 780° F. to around 790° F., around 790° F. to around 800° F., around 800° F. to around 810° F., around 810° F. to around 820° F., around 820° F. to around 830° F., and around 830° F. to around 840° F., to name a few non-limiting examples. Within the coke drum, the cracking reactions continue. The resulting cracked products then exit the coke drum as an overhead stream, while coke deposits in the coke drum. In general, this process is continued for a period of around 16 hours to around 24 hours to allow the coke drum to fill with coke. Exemplary ranges of specific cracking process times include around 16 hours to around 18 hours, around 18 hours to around 20 hours, around 20 hours to around 22 hours, and around 22 hours to around 24 hours, to name a few non-limiting examples. In addition, to allow the delayed coking unit to operate on a batch-continuous (or semi-continuous) basis, two or more coke drums are used. While one coke drum is on-line filling with coke, another coke drum can be steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure.

Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOKING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically in a range from around 496° C. to around 538° C. Exemplary ranges of reactor heat that may be used include around 496° C. to around 500° C., around 500° C. to around 510° C., around 510° C. to around 520° C., around 520° C. to around 530° C., around 530° C. to around 538° C., to name a few non-limiting examples. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOKING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOKING™ process that produces the Flexicoke in that the fluid coking process does not include a gasifier.

The term "fracture" (or "hydraulic fracture") refers to a crack or surface of breakage within a subterranean formation, that can be induced by an applied pressure or stress.

As used herein, the term "hydraulic conductivity" refers to the ability of a fluid within a formation to pass through a fracture including proppant at various stress (or pressure) levels, which is based, at least in part, on the permeability of the proppant deposited within the fractures. The hydraulic conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

As used herein, the term "metallurgical coke" refers to a type of coal-derived coke that is produced by heating coal, which causes fixed carbon to fuse to inherent ash and drives off a large percentage of the volatile matter. The resulting metallurgical coke particles include a range of different sizes, with the smallest particles being a fine powder (sometimes referred to as "coke breeze").

The term "particle size(s)," when used herein with reference to a type of particles," refers to the diameter(s) of such particle(s). The term "particle size distribution," when used herein with reference to a type or a collection of particles, refers to the range of diameters for such particles, typically from the minimal to the maximal. The terms "average particle size distribution" and "D50" when used herein with reference to a type or a collection of particles, interchangeably mean the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are at least three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

The term "coal-derived coke" means any coke prepared from coal by, e.g., thermal treatment.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350. 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "non-coke proppant" means any proppant that does not comprise coke proppant particles. Examples of non-coke proppant include sand, ceramic proppants, glass proppants, and polymer proppants.

The term "lightweight proppant (LWP)" refers to proppants having an apparent density within a range of from around 1.2 g/cm$^3$ to around 2.2 g/cm$^3$ (e.g., from around 1.2, 1.3, 1.4, 1.5, 1.6, g/cm$^3$ to around 1.7, 1.8, 1.9, 2.0, 2.1, 2.2, g/cm$^3$), while the term "ultra-lightweight proppant (ULWP)" refers to proppants having an apparent density within a range of from around 0.5 g/cm$^3$ to around 1.2 g/cm$^3$ (e.g., from around 0.5, 0.6, 0.7, 0.8 g/cm$^3$ to around 0.9, 1.0, 1.1, 1.2 g/cm$^3$). A coke proppant may or may not be an LWP. The term "non-LWP proppant" refers to proppants having apparent density higher than 2.2 g/cm$^3$ (e.g., from around 2.3, 2.4, 2.5 to around 2.6, 2.8, 3.0, to 3.2, 3.4, 3.5 g/cm$^3$.) A non-coke proppant may or may not be a non-LWP.

The term "microproppant" means proppant particles having particle sizes of at most 105 μm (140 mesh). The term "microproppant coke particles" means a collection of coke proppant particles having particle sizes of at most 105 μm, but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm). The term "petroleum coke fines" means a collection of microproppant coke particles that are derived from a petroleum source material.

As used herein, the term "pyrolysis coke" refers to a type of coke that is generated via hydrocarbon pyrolysis at temperatures higher than the coking processes for making petroleum coke.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "substantially free" or "essentially free" when used with reference to a component of a composition, interchangeably means that the composition comprises the component at a concentration of ≤10 wt %, ≤5 wt %, ≤3 wt %, ≤1 wt %, or 0 wt %, based on the total weight of the composition, depending on the details of the particular implementation.

As used herein, the term "thermally post-treated coke" refers to petroleum coke that has been heated to temperatures in a range from around 400° C. to around 1200° C. for a predetermined duration that is in a range from around 1 minute to around 24 hours. Exemplary ranges of temperatures for heating thermally post-treated coke include around 400° C. to around 500° C., around 500° C. to around 600° C., around 600° C. to around 700° C., around 700° C. to around 800° C., around 800° C. to around 900° C., around 900° C. to around 1000° C., around 1000° C. to around 1100° C. and around 1100° C. to around 1200° C., to name a few non-limiting examples. Exemplary ranges of times for heating thermally post-treated coke include around 1 minute to around 1 hour, around 1 hour to around 2 hours, around 2 hours to around 4 hours, around 4 hours to around 8 hours, around 8 hours to around 12 hours, around 12 hours to around 16 hours, around 16 hours to around 20 hours and around 20 hours to around 24 hours, to name a few non-limiting examples.

The term "wellbore" refers to a borehole drilled into a subterranean formation. The borehole may include vertical, deviated, highly deviated, and/or lateral sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about", "around," or "approximately" the indicated value, and account for experimental errors and variations that would be expected by a person having ordinary skill in the art.

During the drilling of a hydrocarbon well, a wellbore may be formed within a subterranean formation using a drill bit that may be advanced at the lower end of a drill string until it reaches a predetermined location in the subsurface. The drill string and bit may then be removed, and the wellbore may be lined with steel tubulars, commonly referred to as casing strings. An annulus may thus be formed between the casing strings and the surrounding subterranean formation. A cementing operation may be conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string may be cemented entirely back to the surface.

A process of drilling and then cementing progressively-smaller casing strings may be repeated several times below the surface casing string until the hydrocarbon well has reached total depth. The final casing string, referred to as the "production casing string," may extend through a hydrocarbon-bearing interval (referred to as a "reservoir") in the subterranean formation. In some instances, the production casing string is a production liner, that is, a casing string that is not tied back to the surface. The production casing string may also be cemented into place. In some completions, the production casing string has swell packers or plugs spaced across selected productive intervals. This creates compartments between the packers for isolation of stages and specific stimulation treatments. In this instance, the annulus may simply be packed with sand.

As part of the completion process, a section of the wellbore may be isolated through the setting of a packer or plug. The production casing string may then be perforated at one or more desired intervals uphole of the plug. This means that holes (which are referred to as "perforations") may be created through the production casing string and the cement column surrounding the production casing string using a perforating gun. In operation, the perforating gun may form one perforation cluster by shooting a number of holes in close proximity, such as, for example, 12 to 18 perforations at one time, over a 1 foot (ft) (0.3 meter (m)) to 3 ft (0.9 m) region, for example, with each perforation potentially being approximately 0.3 inches (in) (0.8 centimeters (cm)) to 0.5 in (1.3 cm) in diameter, for example. The perforating gun may then be moved uphole around 10 ft (3 m) to 100 ft (30 m), for example, and a second perforating gun may be used to form a second perforation cluster. This process of forming perforation clusters may be repeated to create additional perforation clusters within each stage of the hydrocarbon well. The resulting clusters of perforations may allow hydrocarbon fluids from the surrounding subterranean formation to flow into the hydrocarbon well. Note that in some instances, however, the production casing string is instead provided as a sliding sleeve tubular or other type of casing string with pre-formed perforation clusters. In such instances, the preformed perforations may be initially closed but can be opened through various forms of actuation to control fluid flow through the perforations.

After the perforation process is complete, the subterranean formation may be hydraulically fractured at each stage of the wellbore to increase the productivity of the subterranean formation. Hydraulic fracturing consists of injecting a volume of fracturing fluid through the created perforations and into the surrounding subterranean formation at such high pressures and rates that the subsurface rock in proximity to the perforations cracks open and resulting hydraulic fractures extend outwardly into the formation in proportion to the injected fluid volume. Ideally, a separate hydraulic fracture emanates outwardly from each perforation cluster, forming a set of fractures, commonly referred to as a "fracture network." Ideally, this fracture network includes a sequence of parallel fracture planes, thereby creating as much fracturing of the subsurface rock as possible. Near the wellbore, a complex topology of hydraulic fractures may sometimes result from the breakdown of perforations within each perforation cluster, but it is common to assume that these hydraulic fractures ultimately link up to form a single dominant fracture plane that is hydraulically connected to the wellbore. In operation, to create the hydraulic fracture, the injection pressure of the fracturing fluid must exceed the hydraulic pressure in the subterranean formation plus the strength of the rock, and often even exceeds the lithostatic pressure in the formation.

Hydraulic fracturing is used most extensively for increasing the productivity of "unconventional," or "tight," subterranean formations, which are formations with very low permeability that typically do not produce economically without hydraulic fracturing. Examples of unconventional formations include tight sandstone formations, tight carbonate formations, shale gas formations, coal bed methane formations, and tight oil formations. During the hydraulic fracturing of such subterranean formations, the pump rate (or injection rate) of the fracturing fluid may be increased until it reaches a maximum pump rate of around 20 barrels per minute (bbl/min) (0.05 cubic meters per second (m$^3$/s)) to around 150 bbl/min (0.4 m$^3$/s) (e.g., from 20, 25, 30, 35, 40, 45, 50 bbl/min to 60, 65, 70, 75, 80, 85, 90, 95, 100 bbl/min, to 60, 70, 80, 90, 100 bbl/min, to 110, 120, 130, 140, 150 bbl/min). In operation, around 5,000 barrels (795 m$^3$) to around 15,000 barrels (2385 m$^3$) of fracturing fluid (e.g., from 5,000, 5,500, 6,000, 6,500, 7,000, 7,500, 8,000, 8,500, 9,000, 9,500 bbl to 10,000, 10,500, 11,000, 11,500, 12,000, 12,500, 13,000, 13,500, 14,000, 14,500, 15,000 bbl) may be injected for each stage of the hydrocarbon well, for example.

In operation, a small portion (e.g., often around 5% to around 10%) of the fracturing fluid may be pumped into the wellbore during a pad phase of the hydraulic fracturing operation for each stage. The pad phase is designed to initiate hydraulic fractures and grow the hydraulic fractures to a certain size and volume to accommodate the injection of a proppant, such as sand, crushed granite, ceramic beads, or other granular materials (which are generally referred to herein as "non-coke proppants"). The remaining portion of the fracturing fluid may then be mixed with the proppant and pumped into the wellbore and through the perforations into the stimulated reservoir volume (SRV). The proppant serves to hold the hydraulic fractures open after the hydraulic pressure is released. Ideally, the resulting hydraulic fractures grow to be hundreds of feet radially from the wellbore into the subterranean formation. In the case of unconventional formations, the combination of hydraulic fractures and injected proppant substantially increases the flow capacity of the treated formation.

This application of hydraulic fracturing is a routine part of petroleum industry operations as applied to individual subterranean formations. Such subterranean formations may represent hundreds of feet of gross, vertical thickness of subterranean formation. More recently, hydrocarbon wells are being completed through formations laterally, with the lateral sections often extending at least 5,000 ft (1,524 m), in which case the hydrocarbon well may be referred to as an "extended-reach lateral well," or, in some cases, at least 15,000 ft (3,962 m), in which case the hydrocarbon well may be referred to as an "ultra-extended-reach lateral well."

When there are multiple-layered or very thick formations to be hydraulically fractured, or where an extended-reach or ultra-extended-reach lateral well is being completed, then more complex treatment techniques may be utilized to obtain treatment of the entire target area. Therefore, the operating company may isolate the various stages (as described above) to ensure that each separate stage is not only perforated, but also adequately fractured and treated. In this way, the operator may be sure that fracturing fluid is being injected through each perforation cluster and into each stage of interest to effectively increase the flow capacity at each desired depth and lateral location.

Treatment of a stage of interest may involve isolating the stage from all stages that have already been treated. This may involve the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process may be repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there may be around 20 to around 50 individual stages, for example. For ultra-extended-reach lateral wells, there may be more than 100 stages, for example.

After the hydraulic fracturing process is complete, the frac plugs (and/or other diversion materials) may be drilled out of the hydrocarbon well. The hydrocarbon well may then be put into production, meaning that it may be used to recover hydrocarbon fluids from the subterranean formation. In operation, the pressure differential between the formation and the hydrocarbon well may be used to force hydrocarbon fluids to flow through the hydraulic fractures within the formation and into the production casing string via the corresponding perforation clusters. The hydrocarbon fluids then flow up the hydrocarbon well to the surface.

In operation, the success of the hydraulic fracturing process has a direct impact on the ultimate production performance of the hydrocarbon well. Specifically, the numbers, sizes, compliances, and locations of the hydraulic fractures corresponding to the perforation clusters within each stage of the hydrocarbon well directly impact the amount of hydrocarbon fluids that are able to mobilize and flow into the hydrocarbon well. However, even in cases where the initial hydraulic fracturing operation is highly successful, the production performance of the hydrocarbon well degenerates over time for various reasons. One potential reason for such a decline in production performance is that the subterranean formation becomes depleted over time, and the formation pressure begins to decline. Eventually, the formation pressure may decrease to the point where it is no longer possible to produce hydrocarbon fluids from the subterranean formation by natural flow. Additional equipment, such as pumps, may then be used for a period of time to continue producing hydrocarbon fluids from the subterranean formation. However, continued pressure decline may eventually cause further production to become uneconomical.

Another potential reason for such a decline in production performance is that the subterranean formation may not have been effectively treated during the initial hydraulic fracturing operation. Various factors come into play in this regard, including, for example, heterogeneity within the rock of the subterranean formation, stress shadow effects, and/or inefficient hydraulic fracturing parameters (e.g., pump rate, pump volume, proppant type, and the like) during the initial hydraulic fracturing operation. In many cases, due to such ineffective formation treatment, only around one third of the wellbore may be responsible for around 75% of production. Therefore, large segments of the wellbore may be underutilized.

Yet another potential reason for such a decline in production performance is that the hydraulic fractures may lose hydraulic conductivity over time, with some hydraulic fractures only contributing to production for a short time after the initial hydraulic fracturing operation. Such a loss in hydraulic conductivity can have many causes but is generally attributable at least in part to proppant embedment and/or proppant degradation over time, which is particularly common when non-coke proppants, such as sand, are utilized during the hydraulic fracturing operation. Eventually, the hydraulic conductivities of the hydraulic fractures may decrease to the point where it is uneconomical to continue producing hydrocarbon fluids from the subterranean formation.

When such a decline in production performance becomes particularly pronounced, a refracturing operation is sometimes performed to extend the productive lifetime of the hydrocarbon well. Such refracturing operation may include restimulating the hydrocarbon well to reopen and/or extend the initial hydraulic fractures that have fully or partially closed due to proppant embedment and/or proppant degradation, for example. Additionally or alternatively, such refracturing operation may include recompleting at least a portion of the wellbore to create new perforations and new corresponding hydraulic fractures within areas of the subterranean formation that were previously bypassed or under-stimulated.

However, the success of such refracturing operations is typically limited due to the utilization of the same types of proppants that contributed to the initial decline in production. In particular, such proppants (which typically include non-coke proppants, such as sand, crushed granite, and/or ceramic beads) have limited ability to penetrate deeply into previously-unreached and/or under-stimulated areas of the subterranean formation and instead have a tendency to settle within near-wellbore regions of the subterranean formation, which may have already been effectively drained via the initial hydraulic fractures.

The present disclosure alleviates the foregoing difficulty and provides related advantages as well. In particular, the present disclosure provides for the refracturing of subterranean formations using coke proppant particles. More specifically, according to the present disclosure, coke proppant particles are provided as at least a portion of the proppant particles within a fracturing fluid, and such fracturing fluid is then introduced into a previously-treated subterranean formation via a previously-completed wellbore as part of a refracturing operation. Such refracturing operation may include the restimulation of the initial hydraulic fractures to reopen and/or extend hydraulic fractures that have fully or partially closed (e.g., due to proppant embedment and/or proppant degradation). Additionally or alternatively, such refracturing operation may include the recompletion of at least a portion of the wellbore to create new perforations and new corresponding hydraulic fractures within areas of the subterranean formation that were previously bypassed or under-stimulated.

With regard to the utilization of petroleum coke as a proppant during refracturing operations, petroleum coke has sufficient crush strength to maintain propped fractures upon the removal of hydraulic pressure and to maintain efficient conductivity once the wellbore is brought on production. In addition, the relatively low density of petroleum coke may decrease or eliminate the need to use gelled fracturing fluids, thereby avoiding the costs associated with gelation. Furthermore, using petroleum coke may potentially reduce required pumping pressures, reduce overall water consumption, and avoid the need for frequent wellbore cleanout operations.

Effective proppant particles are typically associated with a variety of particular characteristics or properties, including efficient proppant particle transport within a carrier fluid, sufficient strength to maintain propped fractures upon the removal of hydraulic pressure, and efficient conductivity once the wellbore is brought on production. With respect to the proppant particle transport properties, the settling rate of a proppant particle within a fracturing fluid at least in part determines its transport capacity within a hydraulic fracture. The settling rate of a proppant particle can be determined using Equation (1).

$$v = \frac{\rho_p - \rho_f}{18\eta} g\sigma^2, \tag{1}$$

In Equation (1), v is the proppant particle, $\rho_p - \rho_f$ is proportional to the density difference between the proppant particle and the carrier fluid, n is the viscosity of the carrier fluid, g is the gravitational constant, and $\sigma^2$ is proportional to the square of the proppant particle size. As will be appreciated, proppant particles having lower apparent densities and/or smaller particle sizes settle at a slower rate within an identical carrier fluid (thus having better transport) compared to higher apparent density and/or larger particle sized proppant particles.

Figure 2:
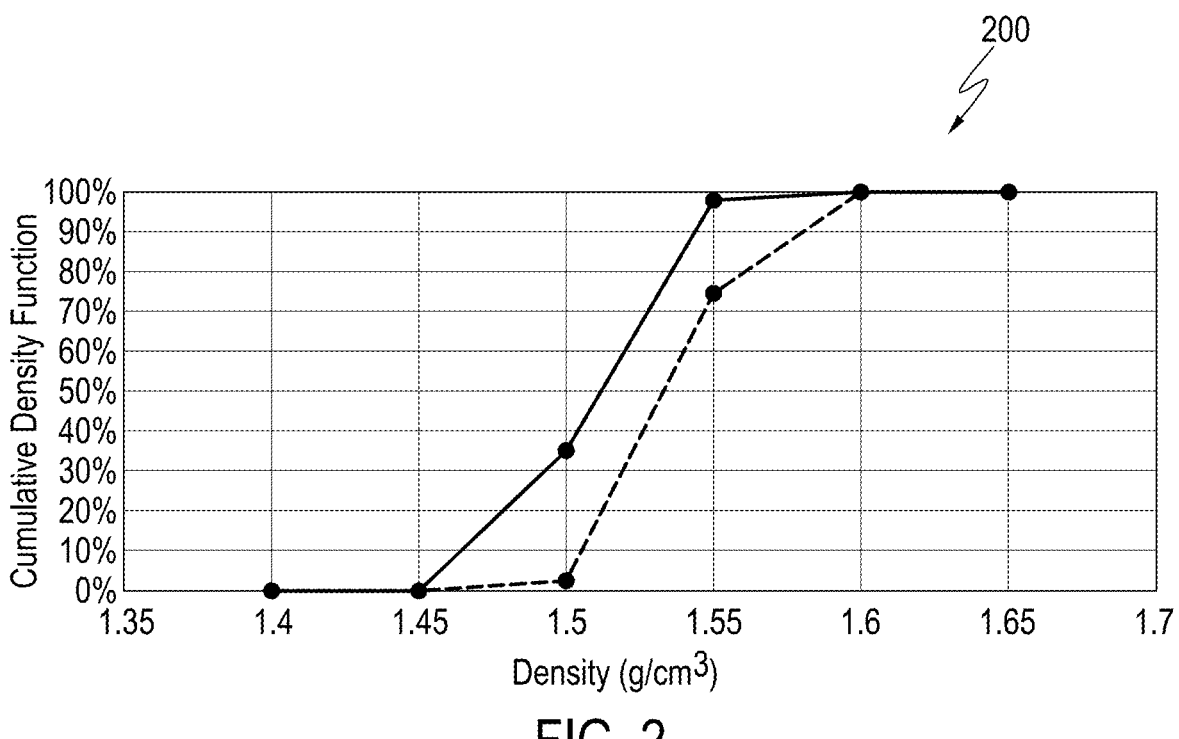
FIG. 2 is a graph showing cumulative density functions for fluid coke particles within two fluid coke samples.

Petroleum coke is therefore particularly well-suited for utilization as a proppant during refracturing operations due at least in part to the relatively low apparent densities of petroleum coke particles as compared to non-coke proppants (e.g., sand). This is illustrated by FIG. 1, which is a graph 100 comparing the apparent densities of petroleum coke particles within a petroleum coke sample to the apparent densities of sand particles within a sand sample. Specifically, the apparent densities of the petroleum coke particles (i.e., in this example, fluid coke particles) and the sand particles were determined in the laboratory by measuring the mass of each type of particle that settled in a given density of brine. Based on these measurements, the apparent densities of the petroleum coke particles ranged from around 1.3 g/cm³ to around 1.7 g/cm³ (e.g., from around 1.3, 1.4, 1.5 g/cm³ to around 1.6, 1.7 g/cm³), as shown at 102, while the apparent densities of the sand particles ranged from around 2.6 g/cm³ to around 2.7 g/cm³, as shown at 104. Therefore, the apparent density of petroleum coke is significantly lower than the apparent density of sand. Moreover, the apparent density of typical carrier fluid (e.g., water) generally ranges from around 1.0 g/cm³ to around 1.2 g/cm³, as shown at 106. Moreover, FIG. 2 is a graph 200 showing cumulative density functions for fluid coke particles within two fluid coke samples. As shown, the densities of the fluid coke particles ranged from around 1.4 g/cm³ to around 1.65 g/cm³ (e.g., from around 1.4, 1.45, 1.5, 1.5 g/cm³ to around 1.6, 1.65 g/cm³).

Figures 3, 4:
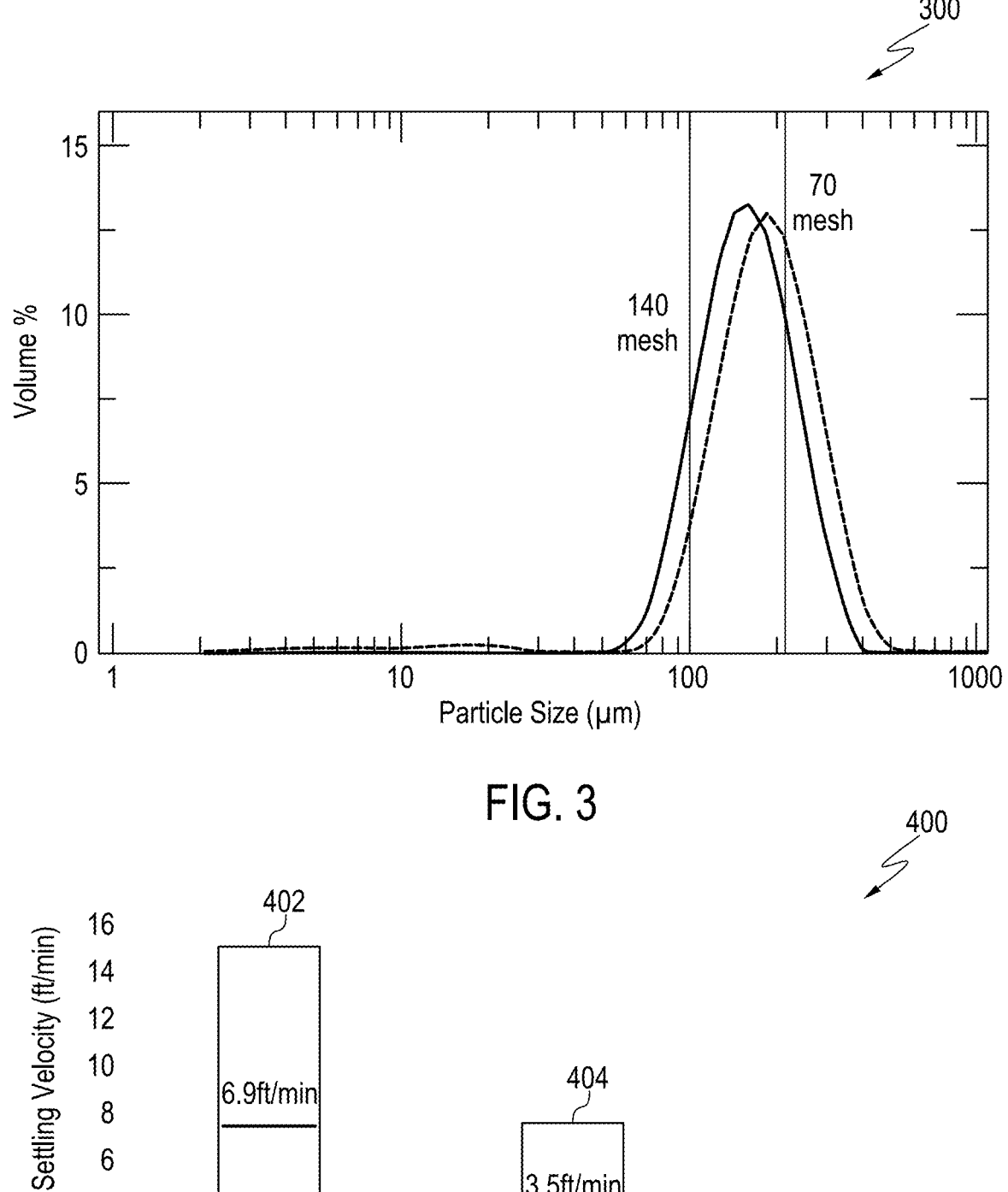
FIG. 3 is a graph showing particle size distributions for fluid coke particles within two fluid coke samples.
FIG. 4 is a bar graph showing the terminal settling velocities in recycled water for sand particles within a 40/70-mesh sand sample, sand particles within a 100-mesh sand sample, and fluid coke particles within a 100-mesh fluid coke sample.

The transport properties of petroleum coke proppant particles are further enhanced by the differentiated size distribution of such particles. Specifically, while the particle size of sand generally ranges from around 105 microns (μm) to around 850 μm (i.e., around 140 mesh to around 20 mesh) (e.g., from around 105, 125, 150, 200, 250, 300, 350, 400, 450 μm to 500, 550, 600, 650, 700, 750, 800 μm), the particle size of petroleum coke can be varied such that it either approximates the particle size of sand or is provided with smaller particle sizes. As an example, FIG. 3 is a graph 300 showing particle size distributions for fluid coke particles within two fluid coke samples. As shown, the particle sizes for the two fluid coke samples were from around 100 μm to around 210 μm (i.e., around 140 mesh to around 70 mesh), which encompasses the lower end of the range of typical particle sizes for different types of sand. Moreover, as described further herein, coke particles (including petroleum coke particles) may also be provided with much smaller particle sizes via the utilization of microproppant coke particles, which may have particle sizes of at most 105 μm (140 mesh) or, in some cases, at most 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

As described above with respect to Equation (1), because petroleum coke particles have lower apparent densities and similar or smaller particle sizes as compared to non-coke proppants (e.g., sand), such petroleum coke particles also have lower settling rates within the carrier fluid and, therefore, have enhanced transport properties as compared to sand. This is illustrated by FIG. 4, which is a bar graph 400 showing the terminal settling velocities in recycled water for sand particles within a 40/70-mesh sand sample, sand particles within a 100-mesh sand sample, and fluid coke particles within a 100-mesh fluid coke sample. In particular, the average terminal settling velocity for the sand particles within the 40/70-mesh sand sample was 6.9 feet per minute (ft/min), as shown at 402; the average terminal settling velocity for the sand particles within the 100-mesh sand sample was 3.5 ft/min, as shown at 404; and the average terminal settling velocity for the fluid coke particles within the 100-mesh fluid coke sample was 0.6 ft/min, as shown at 406. Therefore, fluid coke particles (which are representative of other types of petroleum coke particles) will clearly transport further into hydraulic fractures than sand particles. As a result, proppants formed at least in part from petroleum coke are capable of propping extended regions of new and/or existing hydraulic fractures that would not be effectively propped by non-coke proppants, thus increasing the overall stimulated reservoir volume (SRV) in the subterranean formation and leading to increased production performance for the corresponding hydrocarbon well.

Figures 5, 6:
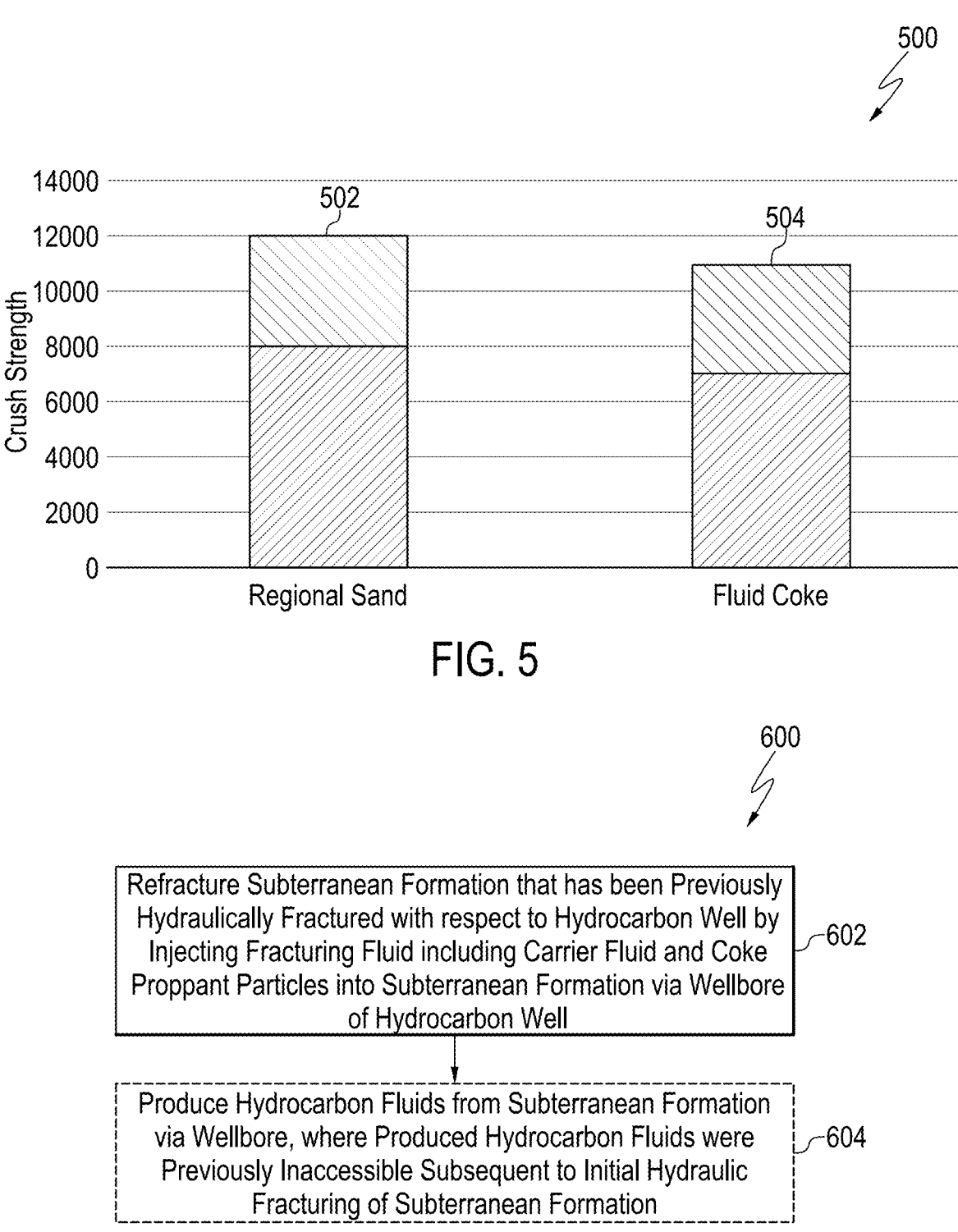
FIG. 5 is a bar graph comparing the crush strengths of sand particles within a regional sand sample to the crush strengths of fluid coke particles within a fluid coke sample.
FIG. 6 is a process flow diagram of an exemplary method for performing a refracturing operation using coke proppant particles in accordance with the present disclosure.

Furthermore, the crush strength of a proppant particle is a measure of the particle's ability to withstand stresses within a hydraulic fracture, with efficient proppant particles being capable of resisting sustained loads within hydraulic fractures during the lifetime of the corresponding wellbore without comprising the hydraulic conductivity of such hydraulic fractures. As a result, proppant particles with higher crush strengths are favorable. According to API RP-19C standards, adequate proppant particles should have a crush strength indicating that less than 10% of fines are produced under a stress of 5,000 psi. In this regard, the crush strength of petroleum coke is advantageously comparable to the crush strength of sand. This is illustrated by FIG. 5, which is a bar graph 500 comparing the crush strengths of sand particles within a regional sand sample, as shown at 502, to the crush strengths of fluid coke particles within a fluid coke sample, as shown at 504. Such crush strength was determined according to API K crush strength testing by applying stress to the respective particles in increments of 1,000 pounds per square inch (psi) until 10% fines were formed, with the crush strength of the particles within each sample being the pressure (in psi) at which 10% fines were formed. As shown in FIG. 5, the crush strength of fluid coke (which is representative of other types of petroleum coke) is comparable to the crush strength of regional sand.

Any suitable type(s) of coke may be used for the coke proppant particles described herein. For example, the coke proppant particles may include (but are not limited to) fluid coke particles, flexicoke particles, delayed coke particles, thermally post-treated coke particles, pyrolysis coke particles, coal-derived coke particles (e.g., blast furnace coke particles and/or metallurgical coke particles), and/or micro-proppant coke particles, or any combination thereof.

For embodiments in which flexicoke particles are utilized as at least a portion of the coke proppant particles described herein, such flexicoke particles are produced via the FLEXICOKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., around 85, 86, 87, 88, 89, 90, 91, 92, 93, 94, 95, 96, 97, 98 or 99 wt %); a weight ratio of carbon to hydrogen that is in a range from around 80:1 to around 95:1 (e.g., around 80:1, 82:1, 84:1, 86:1, 88:1, 90:1, 92:1, 94:1 or 95:1); and an impurities content (i.e., a weight percent of all components other than carbon and hydrogen) that is in a range from around 1 wt % to around 10 wt % (e.g., around 1, 2, 3, 4, 5, 6, 7, 8, 9 or 10 wt %). Flexicoke also has a higher metal content than other cokes. In particular, the flexicoke particles may have a combined vanadium and nickel content that is in a range from around 3,000 parts per million (ppm) to around 45,000 ppm (e.g. around 3,000, 5,000, 10,000, 15,000, 20,000 ppm to 25,000, 25,000, 30,000, 35,000, 40,000, 45,000 ppm). In addition, the flexicoke particles may have a sulfur content that is in a range from 0 wt % to around 5 wt %, as well as a nitrogen content that is in a range from 0 wt % to around 3 wt %.

The apparent density of the flexicoke particles may be in a range from around 1.0 $g/cm^3$ to around 2.0 $g/cm^3$ (e.g., from around 1.0, 1.1, 1.2, 1.3, 1.4, 1.5 $g/cm^3$ to around 1.7, 1.8, 1.9, 2.0 $g/cm^3$). Traditional sand-based proppants generally have apparent densities of at least around 2.5 $g/cm^3$. Thus, the flexicoke particles have substantially lower apparent densities compared to non-coke, sand-based proppants, which is indicative of their comparably more effective transport and lower settling rates within a fracture formed as part of a hydraulic fracturing operation.

For embodiments in which fluid coke particles are utilized as at least a portion of the coke proppant particles described herein, such fluid coke particles are obtained via a fluid coking process. Generally-speaking, flexicoke is considered to be a type (or subset) of fluid coke. Therefore, as expected, the fluid coke particles include a number of the same (or similar) characteristics as flexicoke. However, the fluid coking process may be manipulated in various ways to produce fluid coke particles having a number of distinctive characteristics. For example, the fluid coke particles may have a carbon content that is in a range from around 75 wt % to around 93 wt % (e.g., around 75, 76, 77, 78, 79, 80, 81, 82, 83, 84, 85, 86, 87, 88, 89, 90, 91, 92 or 93 wt %); a weight ratio of carbon to hydrogen that is in a range from around 30:1 to around 50:1 (e.g., around 30:1, 32:1, 34:1, 36:1, 38:1, 40:1, 42:1, 44:1, 46:1, 48:1 or 50:1); and an impurities content that is in a range from around 5 wt % to around 25 wt % (e.g., around 5, 7, 9, 11, 13, 15, 17, 19, 21, 23 or 25 wt %). The fluid coke particles may also have a sulfur content that is in a range from around 3 wt % to around 10 wt % (e.g., around 3, 4, 5, 6, 7, 8, 9 or 10 wt %), as well as a nitrogen content that is in a range from around 0.5 wt % to around 3.0 wt % (e.g., around 0.5, 1.0, 1.5, 2.0, 2.5 or 3.0 wt %. In addition, the apparent density of the fluid coke particles may be in a range from around 1.4 g/cm$^3$ to around 2.0 g/cm$^3$ (e.g., around 1.4, 1.5, 1.6, 1.7, 1.8, 1.9 or 2.0 g/cm$^3$).

For embodiments in which delayed coke particles are utilized as at least a portion of the coke proppant particles described herein, such delayed coke particles are produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature that is in a range from around 480° C. to around 515° C. (e.g., around 480, 485, 490, 500, 505, 510, 515° C., to name a few non-limiting examples). The heated feedstock then enters a reactor, referred to as a "coke drum," which typically operates at temperatures that are in a range from around 415° C. to around 450° C. (e.g., around 415, 420, 425, 430, 435, 440, 445, 450° C., to name a few non-limiting examples). Within the coke drum, the cracking reactions continue. The resulting cracked products then exit the coke drum as an overhead stream, while coke deposits on the inner surface of the coke drum. In general, this process is continued for a period of around 16 hours to around 24 hours (e.g., around 16, 17, 18, 19, 20, 21, 22, 23, 24 hours, to name a few non-limiting examples) to allow the coke drum to fill with coke. In addition, to allow the delayed coking unit to operate on a batch-continuous (or semi-continuous) basis, two or more coke drums are typically used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke particles may exhibit the following properties: (1) a carbon content that is in a range from around 82 wt % to around 90 wt % (e.g., around 82, 83, 84, 85, 86, 87, 88, 89, 90 wt %); (2) a weight ratio of carbon to hydrogen that is in a range from around 15:1 to around 30:1 (e.g., around 15:1, 16:1, 18:1, 20:1, 22:1, 24:1, 26:1, 28:1 or 30:1); (3) a combined vanadium and nickel content that is in a range from around 100 ppm to around 3,000 ppm (e.g. 100, 500, 1,000, 1,500, 2,000, 2,500, 3,000 ppm); (4) a sulfur content that is in a range from around 2 wt % to around 8 wt % (e.g., around 2, 3, 4, 5, 6, 7, 8 wt %); and/or (5) a nitrogen content that is in a range from around 1 wt % to around 2 wt % (e.g., 1.0, 1.1. 1.2, 1.3, 1.4, 1.5, 1.6, 1.7, 1.8, 1.9 or 2.0 wt %), where such properties are measured on a dry, ash-free basis (or, in other words, not counting residual ash content and removing moisture before the analysis). In addition, the delayed coke particles may have a moisture content that is in a range from around 6 wt % to around 14 wt % (e.g., around 6, 7, 8, 9, 10, 11, 12, 13, 14 wt %) and a volatile matter content that is in a range from around 6 wt % to around 18 wt % (e.g., 6, 7, 8, 9, 10, 11, 12, 13, 14, 15, 16, 17, 18 wt %), as measured on an as-received basis. Moreover, the apparent density of the delayed coke particles may be in a range from around 1.0 g/cm$^3$ to around 1.7 g/cm$^3$ (e.g., around 1.0, 1.1, 1.2, 1.3, 1.4, 1.5, 1.6, 1.7 g/cm$^3$). Furthermore, the crush strength of the delayed coke particles may be comparable to the crush strengths of other types of petroleum coke particles.

For embodiments in which microproppant coke particles are utilized as at least a portion of the coke proppant particles described herein, such microproppant coke particles may include wet flexicoke fines and/or dry flexicoke fines produced as a byproduct of the FLEXICOKING™ process. Additionally or alternatively, the microproppant coke particles may include sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke). Additionally or alternatively, in some embodiments, the microproppant coke particles may include ground fluid coke, ground flexicoke, ground delayed coke, ground thermally post-treated coke, ground pyrolysis coke, and/or ground coal-derived coke (e.g., ground blast furnace coke and/or ground metallurgical coke). Moreover, any other suitable types of microproppant coke particles may be additionally or alternatively utilized.

With respect to the utilization of microproppant coke particles including wet and/or dry flexicoke fines as at least a portion of the coke proppant particles described herein, such flexicoke fines are byproducts of the FLEXICOKING™ process, which are collected as particles that were not recovered in the secondary cyclones of the heater within the flexicoker. More specifically, the particles are collected first in the tertiary cyclone as dry flexicoke fines, and the smaller particles that travel past the tertiary cyclone are then recovered in the venturi scrubber as wet flexicoke fines. While at least a portion of such flexicoke fines would typically be considered as waste, the present disclosure provides for the effective utilization of such flexicoke fines during refracturing operations.

With respect to the utilization of microproppant coke particles including sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke) as at least a portion of the coke proppant particles described herein, any suitable type(s) of filters, screens, and/or associated machinery may be utilized to separate any suitable type(s) of bulk coke granules into larger particles as well as smaller particles that are suitable for utilization as the microproppant coke particles. Furthermore, with respect to the utilization of microproppant coke particles including ground fluid coke, ground flexicoke, ground delayed coke, ground thermally post-treated coke, ground pyrolysis coke, and/or ground coal-derived coke (e.g., ground blast furnace coke and/or ground metallurgical coke) as at least a portion of the coke proppant particles described herein, any suitable type(s) of grinding/milling technique(s) may be used to produce such microproppant coke particles. For example, in some embodiments, coke granules may be processed using hammer milling techniques, jet milling techniques, ball milling techniques, or the like, where each of these techniques generally involves crushing or pulverizing the coke granules to a suitable size and shape. Moreover, those skilled in the art will appreciate that any number of other grinding, milling, or other processing techniques may be additionally or alternatively used, depending on the details of the particular implementation.

In various embodiments, the microproppant coke particles that may be utilized according to embodiments described herein include a particle size of at most 105 μm (140 mesh)

or, in some cases, a particle size of at most 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm). Moreover, in various embodiments, such microproppant coke particles have an apparent density that is in a range from around 1.0 g/cm³ to around 2.0 g/cm³ (e.g. 1.0, 1.1, 1.2, 1.3, 1.4, 1.5, 1.6, 1.7, 1.8, 1.9, 2.0 g/cm³), although the exact apparent density of the particles may vary depending on the specific type(s) of coke utilized. By comparison, sand generally has an apparent density of around 2.5 g/cm³ or higher. Therefore, because the settling rate is proportional to the difference in density between the solid particles and the carrier fluid (as shown in expressions for both Stokes terminal settling velocity and Ferguson & Church settling velocity), such microproppant coke particles have a significantly lower settling rate than sand. As a result, such microproppant coke particles will perform better than proppant particles formed from sand in terms of transport capacity within hydraulic fractures that are created, reopened, and/or extended during a refracturing operation.

Furthermore, with respect to the utilization of microproppant coke particles as at least a portion of the coke proppant particles described herein, such microproppant coke particles may provide a number of additional advantages over non-coke proppants. As an example, the microproppant coke particles are small enough to enter regions of secondary and natural fractures that cannot be effectively reached by non-coke proppants. As another example, due to the enhanced transport properties of the microproppant coke particles, such particles are capable of creating larger hydraulic fractures (i.e., by increasing one or more dimensions of such hydraulic fractures, such as the fracture lengths, heights, and/or azimuths) than non-coke proppants. As another example, the utilization of the microproppant coke particles as at least a portion of the coke proppant particles described herein may enable the flow rate of the fracturing fluid to be increased since a portion of the fracturing fluid may be diverted into the secondary hydraulic fractures and/or the natural fractures. As another example, the utilization of the microproppant coke particles as at least a portion of the coke proppant particles described herein may help to control the leak-off of the fracturing fluid into the secondary and natural fractures, thereby increasing the fracturing fluid efficiency and leading to the creation of larger conductive fractures.

Turning now to details regarding exemplary characteristics of the fracturing fluid in which the coke proppant particles described herein may be employed, such fracturing fluid may include (in addition to the coke proppant particles) a flowable carrier fluid, one or more optional additives, and (optionally) one or more other types of proppant particles. In various embodiments, the fracturing fluid is formulated at the well site in a mixing process that is conducted concurrently with the pumping of the fracturing fluid into the wellbore during the refracturing process. When the fracturing fluid is formulated at the well site, the coke proppant particles may be added in a manner similar to known methods for adding proppant to fracturing fluid.

The carrier fluid according to the present disclosure may be an aqueous carrier fluid including water or a nonaqueous carrier fluid that is substantially free of water. Aqueous carrier fluids may include, for example, fresh water, salt water (including seawater), treated water (e.g., treated production water), one or more other forms of aqueous fluid, or any combination thereof. One aqueous carrier fluid class is often referred to as slickwater, and the corresponding fracturing operations are often referred to as slickwater fracturing operations. Nonaqueous carrier fluids may include, for example, oil-based fluids (e.g., hydrocarbon, olefin, mineral oil), alcohol-based fluids (e.g., methanol), or any combination thereof. In various embodiments, the viscosity of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers.

In some instances, the carrier fluid used according to embodiments described herein includes one or more aqueous carrier fluid types, particularly in light of the large volumes of fluid that are typically required (e.g., potentially around 60,000 to around 1,000,000 gallons per wellbore). The aqueous carrier fluid may or may not be gelled. The utilization of gelled aqueous carrier fluids (either crosslinked or un-crosslinked) may facilitate better proppant particle transport (i.e., reduce settling), as well as provide improved physical and chemical strength to withstand the temperatures, pressures, and shear stresses encountered by the fracturing fluid during a refracturing operation. In some instances, the fracturing fluid includes an aqueous carrier fluid, which may or may not be foamed or gelled, and an acid (e.g., HCl) to further stimulate and enlarge pore areas of the matrix of fracture surfaces. It is to be appreciated that the low density of the coke proppant particles described herein may allow a reduction or elimination of the need to foam or gel the carrier fluid. In addition, certain fracturing fluids suitable for use according to embodiments described herein may contain one or more additives. Such additives may include (but are not limited to) one or more acids, one or more biocides, one or more breakers, one or more corrosion inhibitors, one or more crosslinkers, one or more friction reducers (e.g., polyacrylamides), one or more gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

Turning to details regarding the utilization of coke proppant particles during refracturing operations according to aspects and embodiments described herein, the present disclosure provides methods of refracturing using a fracturing fluid including coke proppant particles. Such coke proppant particles may be used, alone or in combination with one or more other types of proppant particles, during the refracturing operation. That is, the coke proppant particles may form the entirety of a proppant pack or may form an integral part of a proppant pack. Other proppant types that may be utilized with the coke proppant particles described herein include (but are not limited to) non-coke proppants (e.g., 100-mesh sand, crushed granite, ceramic beads, or the like), lightweight proppants (LWPs), and ultra-LWPs (ULWP). Proppants including other materials are also within the scope of the present disclosure, provided that any such selected proppants are able to maintain their integrity upon removal of hydraulic pressure within an induced fracture, such that around 80%, preferably around 90%, and more preferably around 95% or greater of the particle mass of the other proppant particles retains integrity when subjected to 5,000 psi of stress, a condition also met by the coke proppant particles described herein. That is, both the coke proppant particles and any other type(s) of proppant particles utilized according to embodiments described herein are capable of maintaining mechanical integrity upon fracture closure, as such particles must (at least partially) intermingle or otherwise associate to form functional proppant packs for a successful refracturing operation.

The methods described herein include the preparation of the fracturing fluid, which is not considered to be particularly limited because the coke proppant particles are capable of transportation in dry form or as part of a wet slurry from a manufacturing site (e.g., a refinery or synthetic fuel plant). Dry and wet forms may be transported via truck or rail, and wet forms may further be transported via pipelines. The transported dry or wet form of the coke proppant particles may be added to the carrier fluid, including the optional additives, at a production site, either directly into a wellbore or by pre-mixing in a hopper or other mixing equipment. For example, in some embodiments, slugs of the dry or wet form of the coke proppant particles may be added directly to the fracturing fluid (e.g., as it is introduced into the wellbore). In other embodiments, such as when other type(s) of proppant particles are combined with the coke proppant particles, a portion or all of the fracturing fluid may be pre-mixed at the production site, or each proppant type may be added directly to the fracturing fluid separately. Any other suitable mixing or adding of the coke proppant particles to produce a desired fracturing fluid composition may also be used, without departing from the scope of the present disclosure. In certain preferred embodiments, the fracturing fluid used in the methods of this disclosure may comprise coke proppant particles at a concentration of at least 14 kilograms (kg) of coke proppant particles per cubic meter ($m^3$) of the carrier fluid, which can range from, e.g., 14, 15, 16, 17, 18, 19, 20 $kg \cdot m^{-3}$, to 21, 22, 23, 24, 25, 26, 27, 28, 29, 30 $kg \cdot m^{-3}$, to 35, 40, 45, 50, 55, 60, 65, 70 $kg \cdot m^{-3}$, to 80, 90, 95, 96, 100, 150, 160, 180, 200 $kg \cdot m^{-3}$, to 220, 240, 250, 260, 280, 300 $kg \cdot m^{-3}$, to 350, 400, 450, 480 $kg \cdot m^{-3}$, based on the volume of the carrier fluid. A concentration range from 18 to 120 $kg \cdot m^{-3}$ is highly desirable. A preferable concentration range is from 23 to 96 $kg \cdot m^{-3}$. At a total coke particle concentration in the fracturing fluid below 14 $kg \cdot m^{-3}$, the amount of coke particles introduced into the subterranean formation may be too low to function as an effective proppant at a given, reasonable volume of carrier fluid; or alternatively, if a reasonable amount of coke particles were to be introduced into the subterranean formation, an infeasibly large volume of the carrier fluid would have to be injected. Either case would be highly undesirable. At a coke particle concentration in the fracturing fluid at above 480 $kg \cdot m^{-3}$, the cost of the coke particles can be too high to justify additional benefit of the higher amount, if any at all. At high loading of the coke proppant particles, the fracturing fluid may become too thick to be effectively pumped.

The refracturing methods that are suitable for use according to aspects and embodiments described herein encompass both restimulation methods and recompletion methods (as well as any suitable combination thereof). Turning first to refracturing methods that are directed to restimulation, such restimulation is provided to reopen and/or extend the existing hydraulic fractures that have fully or partially closed (e.g., potentially due at least in part to the embedment and/or degradation of the previously-used non-coke proppant, as described herein). The utilization of the coke proppant particles described herein during such restimulation may result in the creation of larger hydraulic fractures (i.e., by increasing one or more dimensions of such hydraulic fractures, such as the fracture lengths, heights, and/or azimuths) than would be achieved using non-coke proppants. Moreover, such restimulation may simplify the overall refracturing operation by enabling the utilization of the existing perforations and existing hydraulic fractures, without the necessity of creating any new perforations or blocking the flow of fracturing fluid into the existing hydraulic fractures.

In some embodiments, such restimulation methods include performing bullhead refracturing methods to force the fracturing fluid including the coke proppant particles described herein into the subterranean formation via the existing perforations. Additionally or alternatively, in some embodiments, such bullhead refracturing methods may include the utilization of one or more diversion methods to direct and distribute the fracturing fluid including the coke proppant particles described herein into the subterranean formation via the pre-existing perforations within each stage. In various embodiments, this is accomplished using any of various types of diversion materials, which may include but are not limited to one or more types of ball sealers (e.g., typically biodegradable or self-destructible, and provided with or without accompanying retaining devices), one or more types of plugging materials (e.g., sand, ceramic material, salt, wax, resin, and/or other compounds), and/or one or more chemically-formulated fluids (e.g., viscosified fluids, gelled fluids, foams, or the like). Moreover, in various embodiments, such bullhead refracturing methods may be performed by treating the entire hydrocarbon well all at once, treating the hydrocarbon well by sequentially stimulating one or more sections of the wellbore, or treating the entire hydrocarbon well while sequentially blocking off perforations (or ports) in an attempt to treat all the perforation clusters.

The restimulation methods described herein may or may not include the utilization of one or more diversion methods to direct the flow of the fracturing fluid. For embodiments in which one or more diversion methods are utilized, such methods may include the utilization of one or more types of diversion materials, such as, for example, mechanical devices (e.g., bridge plugs, packers, downhole valves, sliding sleeves, baffle/plug combinations, or the like), one or more types of ball sealers (e.g., typically biodegradable or self-destructible, and provided with or without accompanying retaining devices), one or more types of plugging materials (e.g., sand, ceramic material, salt, wax, resin, and/or other compounds), and/or one or more chemically-formulated fluids (e.g., viscosified fluids, gelled fluids, foams, or the like).

Turning now to refracturing methods that are directed to recompletion, such recompletion is provided to create new perforations and new corresponding hydraulic fractures within areas of the subterranean formation that were previously bypassed or under-stimulated. In some embodiments, such recompletion is accomplished by utilizing a perforating gun to shoot new perforations through the existing production casing string (as well as the corresponding cement column, if any cement column is present). Moreover, in some embodiments, one or more diversion methods are utilized to direct the fracturing fluid including the coke proppant particles into the subterranean formation via the new perforations for each stage (while substantially avoiding the pre-existing perforations), thus creating new hydraulic fractures in the subterranean formation. This may be accomplished using any of various types of diversion materials, which may include but are not limited to one or more types of mechanical devices (e.g., bridge plugs, packers, downhole valves, sliding sleeves, baffle/plug combinations, or the like), one or more types of ball sealers (e.g., typically biodegradable or self-destructible, and provided with or without accompanying retaining devices), one or more types of plugging materials (e.g., sand, ceramic material, salt, wax, resin, and/or other compounds), and/or one or more chemically-formulated fluids (e.g., viscosified fluids, gelled fluids, foams, or the like). Furthermore, it should be noted that such method may also be utilized to perform restimulation, optionally simultaneously with the performance of recompletion.

In other embodiments, this is accomplished by running a new production casing string (e.g., in some cases, a production liner, such as an expandable liner) into the existing production casing string to isolate the existing perforations. A typical plug-and-perf process (or any other suitable type of completion process) may then be used to create new perforations within the new production casing string. The fracturing fluid including the coke proppant particles may then be injected into the subterranean formation via the new perforations for each stage, thus creating new hydraulic fractures in the subterranean formation. Moreover, it should be noted that such method may also be utilized to perform restimulation, optionally simultaneously with the performance of recompletion.

For embodiments in which a new production casing string is utilized during the recompletion operation, such production casing string may be used to form new stages that are substantially longer than the stages that were initially formed within the wellbore. As a non-limiting example, assuming that the initial stage length was at most 100 ft (30.5 m), the new stage length may be at least 100 ft (30.5 m) or, more preferably, at least 200 ft (61 m) (but potentially within the range from around 100 ft (30.5 m) to around 2,000 ft (610 m), for example). While the effective treatment of such long stages with large numbers of perforation clusters is typically challenging when utilizing non-coke proppants, such as 100-mesh sand, the utilization of the coke proppant particles described herein as at least a portion of the fracturing fluid during the refracturing operation enables such long stages to be effectively treated. Specifically, because the coke proppant particles are able to stay suspended within the fracturing fluid for longer periods of time and therefore transport more efficiently into the various perforation clusters, the utilization of such coke proppant particles may advantageously reduce the number of wireline runs, reduce the potential for wellbore tools to become stuck, and reduce the time and cost for performing the recompletion operation, while also advantageously enabling the creation of longer stages with larger numbers of perforation clusters.

For some embodiments in which a new production liner is run into the wellbore during the recompletion operation, such production liner may optionally be provided as a chemical production liner that is configured to chemically seal off the pre-existing perforations. In this manner, such chemical production liner may provide similar results as a traditional liner at lower cost.

Coke, such as, in particular, petroleum coke, is expected to be less erosive than sand and other types of non-coke proppants due to its lower hardness (e.g., the Moh's hardness of petroleum coke particles is less than 6, while the Moh's hardness of quartz particles is around 7) and its lower density (e.g., the specific gravity of petroleum coke particles is around 1.4 to around 1.6, while the specific gravity of quartz particles is around 2.65). As a result, the utilization of coke proppant particles as at least a portion of the proppant within the fracturing fluid according to aspects and embodiments described herein enables the efficient performance of refracturing methods that are not highly successful using sand and other types of non-coke proppants. As an example, the coke proppant particles described herein are particularly suitable for utilization with respect to limited entry and extreme limited entry methods, which are designed to provide pressure drops of at least around 2,000 psi and at least around 3,000 psi, respectively, within the wellbore. Specifically, while sand erosion is particularly pronounced at such large pressure differentials, coke provides a less erosive alternative that enables the maintenance of substantial flow uniformity across the perforation clusters. As another example, the coke proppant particles described herein are particularly suitable for utilization with respect to refracturing methods that employ a wireline and/or downhole tools since highly-erosive sand particles have been known to cause equipment defects that can lead to the failure of such equipment. Moreover, other types of refracturing methods may also similarly benefit from the minimally-erosive nature of coke proppant particles.

Regardless of the type of refracturing operation that is performed, such refracturing operation typically involves pumping fracturing fluid including coke proppant particles into the subterranean formation at a high pump rate to form, reopen, and/or extend hydraulic fractures in the subterranean formation. In some embodiments, this refracturing process is conducted one stage at a time along a wellbore (e.g., for every stage of the wellbore or for some subset thereof, preferably at least 10 stages and more preferably at least 20 stage of the wellbore). In such embodiments, the stage of interest is hydraulically isolated from any other stages that have been previously fractured. In various embodiments, the stage of interest includes perforation clusters that allow the flow of fracturing fluid through the production casing string and into the subterranean formation. In some embodiments, the pump rate of the fracturing fluid during the refracturing operation is at least around 20 barrels per minute (bbl/min) (0.05 cubic meters per second ($m^3$/s)), preferably around 30 bbl/min (0.08 $m^3$/s), and more preferably at least 50 bbl/min (0.14 $m^3$/s) and at most 1000 bbl/min (2.73 $m^3$/s) at one or more time durations during the refracturing operation (e.g., the rate may be constant, steadily increased, or pulsed). These high rates may, in some embodiments, be utilized after around 10% of the entire volume of fracturing fluid to be pumped into the formation has been injected. That is, during the beginning phase of the refracturing operation for each stage, the pump rate may be lower. However, as hydraulic fractures begin to form, reopen, and/or extend in one or more dimensions, the pump rate may be increased (e.g., during the middle and/or later phases of the refracturing operation). Generally, the average pump rate of the fracturing fluid throughout the operation may be around 15 bbl/min (0.04 $m^3$/s) but preferably at least around 25 bbl/min (0.07 $m^3$/s) and at most around 250 bbl/min (0.68 $m^3$/s). Typically, the pump rate of the fracturing fluid during the refracturing operation for more than around 30% of the time required to complete the refracturing of a stage may be in the range of around 20 bbl/min (0.05 $m^3$/s) to around 150 bbl/min (0.41 $m^3$/s) (e.g., around 20, 40, 60, 80, 100, 120, 140, 150 bbl/min).

In various embodiments, the refracturing methods described herein may be performed such that the concentration of the coke proppant particles (and any other type(s) of proppant particles) within the injected fracturing fluid is altered on-the-fly while the refracturing operation is being performed, such that the hydraulic pressure is maintained within the formation and the hydraulic fractures. For example, in some embodiments, the initially-injected fracturing fluid is injected at a low pump rate and includes around 1 weight percent (wt %) proppant particles (i.e., including the coke proppant particles and (optionally) one or more other types of proppant particles) based on the total weight of the fracturing fluid (i.e., including the carrier fluid, any optional additives, and the weight of total proppant particles). As hydraulic fractures begin to form and grow, the pump rate may be increased, and the concentration of the proppant particles may be increased in a stepwise fashion (with or without a corresponding stepwise increase in the pump rate), with a maximum concentration of total proppant particles reaching around 2.5 wt % to around 20 wt %, for example, based on the total weight of the fracturing fluid. For example, the maximum concentration of total proppant particles may reach at least 2.5 wt %, preferably around 8 wt %, and more preferably around 16 wt %. In some embodiments, all of the proppant particles within the fracturing fluid are the coke proppant particles described herein. In other embodiments, at one or more time periods during the refracturing operation, at least around 1 wt % to around 100 wt % of the proppant particles within the fracturing fluid are the coke proppant particles described herein, such as at least around 2 wt %, preferably at least around 15 wt %, and more preferably at least around 25 wt %.

In some embodiments, the initially-injected fracturing fluid does not include any proppant particles. However, as the rock in the subterranean formation begins to fracture, proppant particles may be added into the fracturing fluid at a concentration of around 2 pounds per gallon (ppg) to around 5 ppg of carrier fluid (or around 240 kilograms per cubic meter ($kg/m^3$) to around 600 $kg/m^3$ of carrier fluid). This may be increased to around 10 ppg to around 20 ppg of carrier fluid (or around 1200 $kg/m^3$ to around 2400 $kg/m^3$ of carrier fluid) as the hydraulic fracturing operation progresses. However, the proppant concentration may vary depending on the details of the particular operation and may be determined at least in part based on the type of carrier fluid that is utilized.

In various embodiments, the fracturing fluid including the coke proppant particles (and any other type(s) of proppant particles) are introduced into the subterranean formation during any of various phases of the refracturing operation to allow the coke proppant particles to travel with the fracturing fluid into the tips (or at least within proximity to the tips) of the new and/or pre-existing (e.g., reopened or extended) hydraulic fractures. For example, during the refracturing of each stage of the hydrocarbon well, the coke proppant particles may be included within the fracturing fluid during the beginning phase, the middle phase, and/or the later phase of the refracturing operation. As a non-limiting example, in some embodiments, the coke proppant particles may be introduced into the subterranean formation during the later phase of the refracturing operation for each stage such that the later-introduced slurry of fracturing fluid and coke proppant particles continue to displace the earlier-introduced slurry of fracturing fluid and coke proppant particles further away from the wellbore. As another non-limiting example, in some embodiments, the coke proppant particles are introduced into the subterranean formation throughout the refracturing operation for each stage, either continuously or intermittently. In such embodiments, the ratio of coke proppant particles to other type(s) of proppant particles (e.g., 100-mesh sand) within the fracturing fluid may be maintained at a steady (or substantially steady) value, or the ratio may be varied as the refracturing operation progresses.

In some embodiments, the entire volume of the coke proppant particles to be used for each stage is added to the fracturing fluid (either alone or in combination with one or more other types of proppant particles) during the first one third of the pumping for each stage. In other embodiments, the coke proppant particles are blended with one or more other types of proppant particles within the fracturing fluid throughout the pumping for each stage. In yet other embodiments, the entire volume of the coke proppant particles to be used for each stage is added to the fracturing fluid (either alone or in combination with one or more other types of proppant particles) during the last one third of the pumping for each stage. Moreover, the ratio of coke proppant particles to other proppant particles, if any, within the fracturing fluid can be adjusted throughout the hydraulic fracturing operation, depending on the details of the particular implementation. Furthermore, in some embodiments, the coke proppant particles may be sequenced such that smaller coke proppant particles are predominantly pumped during the earlier phases of the pumping for each stage and larger coke proppant particles are predominantly pumped during the later phases of the pumping for each stage.

Turning to details of an exemplary method according to the present disclosure, FIG. 6 is a process flow diagram of an exemplary method 600 for performing a refracturing operation using coke proppant particles in accordance with the present disclosure. The exemplary method 600 begins at block 602, at which a subterranean formation that has been previously hydraulically fractured with respect to a hydrocarbon well is refractured by injecting a fracturing fluid including a carrier fluid and the coke proppant particles described herein into the subterranean formation via the wellbore of the hydrocarbon well. In various embodiments, the refracturing at block 602 includes restimulating pre-existing hydraulic fractures that were created during the initial hydraulic fracturing of the subterranean formation, which preceded the refracturing of the subterranean formation at block 602. In such embodiments, this may include, for example, extending one or more dimensions of one or more of the pre-existing hydraulic fractures and/or reopening one or more of the pre-existing hydraulic fractures that has at least partially closed subsequent to the initial hydraulic fracturing of the subterranean formation. In some such embodiments, this is performed at least in part via a bullhead refracturing method. Moreover, in some such embodiments, this is performed for a particular stage of the wellbore without diverting the flow of the fracturing fluid away from any of the pre-existing hydraulic fractures within such stage.

In various embodiments, the refracturing at block 602 includes recompleting at least a portion of the wellbore to create new perforations with respect to the wellbore and then creating one or more new hydraulic fracture in the subterranean formation by injecting the fracturing fluid including the carrier fluid and the coke proppant particles into the subterranean formation via one or more of the new perforations. In some embodiments, this includes shooting new perforations within a pre-existing production casing string of the wellbore. Alternatively, in some embodiments, this includes running a new production casing string into the wellbore to isolate pre-existing perforations within the pre-existing production casing string, where the pre-existing perforations were created during the initial hydraulic fracturing of the subterranean formation. In some such embodiments, this further includes forming new stages with respect to the new production casing string that are of a greater length than pre-existing stages with respect to the pre-existing production casing string. Moreover, in some embodiments, the refracturing at block 602 includes both restimulation of pre-existing hydraulic fractures and recompletion of the wellbore to create new perforations.

In some embodiments, during the injection of the fracturing fluid at block 602, one or more diversion materials are utilized to direct the flow of the fracturing fluid within the wellbore. In such embodiments, the diversion materials may include but are not limited to one or more bridge plugs, one or more packers, one or more downhole valves, one or more sliding sleeves, one or more baffle/plug combinations, one or more ball sealers, one or more types of sand, one or more types of ceramic material, salt, one or more types of wax, one or more types of resin, one or types of viscosified fluid, one or more types of gelled fluid, and/or one or more types of foam. Moreover, in some embodiments, the injection of the fracturing fluid at block 602 is performed in accordance with one or more limited entry methods and/or one or more extreme limited entry methods.

According to embodiments described herein, the coke proppant particles include fluid coke, flexicoke, delayed coke, thermally post-treated coke, pyrolysis coke, coal-derived coke (e.g., blast furnace coke and/or metallurgical coke), and/or any other suitable type(s) of coke. Moreover, in some embodiments, the coke proppant particles include microproppant coke particles, such as wet and/or dry flexicoke fines, any suitable type(s) of sieved coke, and/or any suitable type(s) of ground coke, as described herein.

In various embodiments, the fracturing fluid including the carrier fluid and the coke proppant particles is injected into the subterranean formation via the wellbore of the hydrocarbon well for each stage of the hydrocarbon well (or for at least a portion of such stages). In some such embodiments, for each stage, the fracturing fluid including the carrier fluid and the coke proppant particles may be injected into the subterranean formation during at least a portion of the beginning phase of the refracturing operation for the stage, prior to the introduction of a second fracturing fluid including the carrier fluid and second proppant particles that do not include coke into the subterranean formation during the middle and/or later phases of the refracturing operation for the stage. Such second proppant particles may include but are not limited to sand, LWP, and/or ULWP. Alternatively, in some such embodiments, the fracturing fluid itself includes the second proppant particles that do not include coke. In such embodiments, for each stage, the fracturing fluid including the carrier fluid, the coke proppant particles, and the second proppant particles may be injected into the subterranean formation during at least a portion of the beginning phase of the refracturing operation for the stage, during at least a portion of the middle phase of the refracturing operation for the stage, and during at least a portion of the later phase of the refracturing operation for the stage. Moreover, in such embodiments, the concentration of the coke proppant particles within the fracturing fluid as compared to the concentration of the second proppant particles within the fracturing fluid may optionally be adjusted or varied as the refracturing operation progresses with respect to the stage.

In some embodiments, the carrier fluid is an aqueous carrier fluid that includes water. In other embodiments, the carrier fluid is a nonaqueous carrier fluid that is substantially free of water. Moreover, in some embodiments, the fracturing fluid also includes one or more additives, such as one or more acids, one or more biocides, one or more breakers, one or more corrosion inhibitors, one or more crosslinkers, one or more friction reducers (e.g., polyacrylamides), one or more gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

At optional block 604, hydrocarbon fluids are produced from the subterranean formation via the wellbore subsequent to the refracturing of the subterranean formation at block 604, where at least a portion of the produced hydrocarbon fluids were previously inaccessible subsequent to the initial hydraulic fracturing of the subterranean formation. In other words, because the refracturing of the subterranean formation at block 602 effectively increase the stimulated reservoir volume (SRV) by creating, reopening, and/or extending hydraulic fractures into previously bypassed and/or under-stimulated regions of the subterranean formation, the production performance of the hydrocarbon well is substantially increased.

Those skilled in the art will appreciate that the exemplary method 600 of FIG. 6 is susceptible to modification without altering the technical effect provided by the present disclosure. For example, in some embodiments, one or more blocks may be omitted from the method 600, and/or one or more blocks may be added to the method 600. In practice, the exact manner in which the method 600 is implemented will depend at least in part on the details of the specific implementation.

Figure 7:
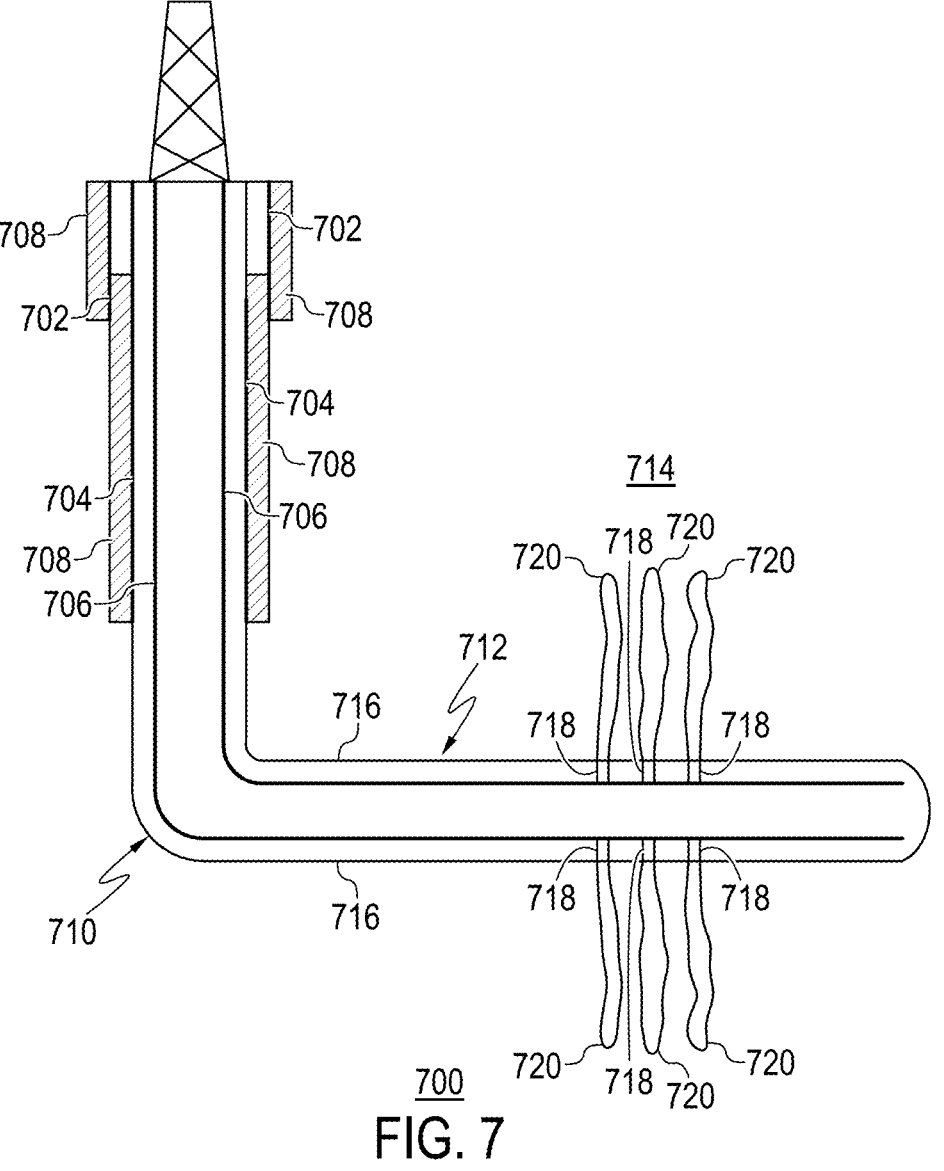
FIG. 7 is a diagram of a hydrocarbon well that may be subject to a hydraulic refracturing operation, in accordance with the present disclosure.

FIG. 7 is a diagram of a hydrocarbon well that may be subject to a hydraulic refracturing operation, in accordance with the present disclosure. FIG. 7 shows a hydrocarbon well 700. The hydrocarbon well 700 is coupled to one or more of casing strings. The casing strings include a surface casing string 702, an intermediate casing string 704, and a production casing string 706. The various casing strings of FIG. 7 are shown being held in place using cement 708. The hydrocarbon well 700 includes a heel 710 that connects the vertical section of the hydrocarbon well 700 to a horizontal section 712 of the hydrocarbon well 700. In various embodiments, below the intermediate casing string 704, the production casing string 706 is exposed to rock in a formation 714. The casing strings extend into the formation 714 through a wellbore 716.

The production casing string 706 includes a plurality of perforations 718. As explained herein, a plurality of hydraulic fractures 720 extend from the production string 706 into the formation 714.

This disclosure can include one or more of the following non-limiting aspects and/or embodiments:

A1. A method, comprising refracturing a subterranean formation that has been previously hydraulically fractured with respect to a hydrocarbon well by injecting a fracturing fluid comprising a carrier fluid and coke proppant particles into the subterranean formation via a wellbore of the hydrocarbon well.

A2. The method of A1, wherein the coke proppant particles are present in the fracturing fluid at a concentration from 14 kilograms per cubic meter to 480 kilograms per cubic meter, based on the volume of the carrier fluid.

A3. The method of A1, wherein the coke proppant particles are present in the fracturing fluid at a concentration from 18 kilograms per cubic meter to 120 kilograms per cubic meter, based on the volume of the carrier fluid.

A4. The method of A1, wherein the coke proppant particles are present in the fracturing fluid at a concentration from 23 kilograms per cubic meter to 96 kilograms per cubic meter, based on the volume of the carrier.

A5. The method of any of A1 to A4, comprising producing hydrocarbon fluids from the subterranean formation via the wellbore subsequent to the refracturing of the subterranean formation, where at least a portion of the produced hydrocarbon fluids were inaccessible subsequent to an initial hydraulic fracturing of the subterranean formation that preceded the refracturing of the subterranean formation.

A6. The method of any of A1 to A5, where injecting the fracturing fluid comprising the carrier fluid and the coke proppant particles into the subterranean formation via the wellbore comprises restimulating pre-existing hydraulic fractures that were created during an initial hydraulic fracturing of the subterranean formation that preceded the refracturing of the subterranean formation.

A7. The method of A6, where restimulating the hydraulic fractures comprises at least one of: extending at least one dimension of the at least one of the pre-existing hydraulic fractures; and reopening at least one of the pre-existing hydraulic fractures that has at least partially closed subsequent to the initial hydraulic fracturing of the subterranean formation.

A8. The method of A6, where the restimulation of the pre-existing hydraulic fractures is performed via a bullhead refracturing method.

A9. The method of A6, where the restimulation of the pre-existing hydraulic fractures is performed for a stage of the wellbore without diverting a flow of the fracturing fluid away from any of the pre-existing hydraulic fractures within the stage.

A10. The method of any of A1 to A9, where injecting the fracturing fluid comprising the carrier fluid and the coke proppant particles into the subterranean formation via the wellbore comprises: recompleting at least a portion of the wellbore to create new perforations with respect to the wellbore; and creating at least one new hydraulic fracture in the subterranean formation by injecting the fracturing fluid comprising the carrier fluid and the coke proppant particles into the subterranean formation via at least one of the new perforations.

A11. The method of A10, comprising recompleting the at least the portion of the wellbore to create the new perforations with respect to the wellbore by shooting new perforations within a pre-existing production casing string of the wellbore.

A12. The method of A10, comprising recompleting the at least the portion of the wellbore to create the new perforations with respect to the wellbore by running a new production casing string into the wellbore to isolate pre-existing perforations within a pre-existing production casing string of the wellbore, where the pre-existing perforations were created during an initial hydraulic fracturing of the subterranean formation that preceded the refracturing of the subterranean formation.

A13. The method of A12, comprising forming new stages with respect to the new production casing string that are of a greater length than pre-existing stages with respect to the pre-existing production casing string.

A14. The method of any of A1 to A13, comprising, during the injection of the fracturing fluid comprising the carrier fluid and the coke proppant particles into the subterranean formation via the wellbore, utilizing at least one diversion material to direct a flow of the fracturing fluid within the wellbore.

A15. The method of A14, where the at least one diversion material comprises at least one of a bridge plug, a packer, a downhole valve, a sliding sleeve, a baffle/plug combination, a ball sealer, sand, a ceramic material, salt, a wax, a resin, a viscosified fluid, a gelled fluid, and a foam.

A16. The method of any of A1 to A15, comprising injecting the fracturing fluid comprising the carrier fluid and the coke proppant particles into the subterranean formation via the wellbore in accordance with at least one of a limited entry method and an extreme limited entry method.

A17. The method of any of A1 to A16, where the coke proppant particles comprise at least one of fluid coke, flexicoke, delayed coke, thermally post-treated coke, pyrolysis coke, blast furnace coke, and coal-derived coke.

A18. The method of any of A1 to A17, where the coke proppant particles comprise microproppant coke particles.

A19. The method of A18, where the microproppant coke particles comprise at least one of wet flexicoke fines and dry flexicoke fines.

A20. The method of A18, where the microproppant coke particles comprise at least one of sieved fluid coke, sieved flexicoke, sieved delayed coke, sieved thermally post-treated coke, sieved pyrolysis coke, and sieved coal-derived coke.

A21. The method of A18, where the microproppant coke particles comprise at least one of ground fluid coke, ground flexicoke, ground delayed coke, ground thermally post-treated coke, ground pyrolysis coke, and ground coal-derived coke.

A22. The method of any of A1 to A121, comprising injecting the fracturing fluid comprising the carrier fluid and the coke proppant particles into the subterranean formation via the wellbore of the hydrocarbon well for each of at least a portion of a number of stages of the hydrocarbon well.

A23. The method of A22, comprising, for each of the at least the portion of the number of stages, injecting the fracturing fluid comprising the carrier fluid and the coke proppant particles into the subterranean formation during at least a portion of a beginning phase of a refracturing operation, prior to an introduction of a second fracturing fluid comprising the carrier fluid and second proppant particles that do not comprise coke into the subterranean formation.

A24. The method of A23, where the second proppant particles comprise at least one of sand, LWP, and ULWP.

A25. The method of A22, comprising, for each of the at least the portion of the number of stages, injecting the fracturing fluid comprising the carrier fluid and the coke proppant particles into the subterranean formation during at least a portion of a later phase of a refracturing operation, after an introduction of a second fracturing fluid comprising the carrier fluid and second proppant particles that do not comprise coke into the subterranean formation.

A26. The method of A25, where the second proppant particles comprise at least one of sand, LWP, and ULWP.

A27. The method of A22, where the fracturing fluid further comprises second proppant particles that do not comprise coke, and where the method comprises, for each of the at least the portion of the number of stages, injecting the fracturing fluid comprising the carrier fluid, the coke proppant particles, and the second proppant particles into the subterranean formation during at least a portion of a beginning phase of a refracturing operation, during at least a portion of a middle phase of the refracturing operation, and during at least a portion of a later phase of the refracturing operation.

A28. The method of A27, where the second proppant particles comprise at least one of sand, LWP, and ULWP.

A29. The method of any of A1 to A28, where the carrier fluid comprises water.

A30. The method of any of A1 to A28, where the carrier fluid is substantially free of water.

A31. The method of any of A1 to A30, where the fracturing fluid further comprises at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

B1. A hydrocarbon well, comprising: a wellbore that extends within a subterranean formation; a production casing string that extends within at least a portion of the wellbore; perforations formed within the production casing string; hydraulic fractures formed in the subterranean formation proximate to the perforations; and coke proppant particles positioned within at least a portion of the hydraulic fractures; where at least a portion of the hydraulic fractures have been restimulated via an injection of a fracturing fluid comprising a carrier fluid and the coke proppant particles into the subterranean formation via at least a portion of the perforations; and where the restimulation of the at least the portion of the hydraulic fractures was performed subsequent to an initial hydraulic fracturing of the subterranean formation.

B2. The hydrocarbon well of B1, where the coke proppant particles comprise at least one of fluid coke, flexicoke, delayed coke, thermally post-treated coke, pyrolysis coke, and coal-derived coke.

B3. The hydrocarbon well of B1 or B2, where the coke proppant particles comprise microproppant coke particles.

B4. The hydrocarbon well of any of B1 to B3, where the hydrocarbon well further comprises second proppant particles that do not comprise coke within at least a portion of the hydraulic fractures.

C1. A hydrocarbon well, comprising: a wellbore that extends within a subterranean formation; a production casing string that extends within at least a portion of the wellbore; perforations formed within the production casing string; hydraulic fractures formed in the subterranean formation proximate to the perforations; and coke proppant particles positioned within at least a portion of the hydraulic fractures; where at least a portion of the perforations comprise new perforations formed within the production casing string subsequent to an initial hydraulic fracturing of the subterranean formation; and where at least a portion of the hydraulic fractures comprise new hydraulic fractures formed via an injection of a fracturing fluid comprising a carrier fluid and the coke proppant particles into the subterranean formation via at least a portion of the new perforations.

C2. The hydrocarbon well of C1, where the coke proppant particles comprise at least one of fluid coke, flexicoke, delayed coke, thermally post-treated coke, pyrolysis coke, and coal-derived coke.

C3. The hydrocarbon well of C1 or C2, where the coke proppant particles comprise microproppant coke particles.

C4. The hydrocarbon well of any of C1 to C3, where the hydrocarbon well further comprises second proppant particles that do not comprise coke within at least a portion of the hydraulic fractures.

D1. A hydrocarbon well, comprising: a wellbore that extends within a subterranean formation; a pre-existing production casing string that extends within at least a portion of the wellbore; a new production casing string that extends within at least a portion of the pre-existing production casing string, where the new production casing string was provided within the wellbore subsequent to an initial hydraulic fracturing of the subterranean formation via the pre-existing production casing string; new perforations formed within the new production casing string; new hydraulic fractures formed in the subterranean formation proximate to the new perforations; and coke proppant particles positioned within at least a portion of the new hydraulic fractures.

D2. The hydrocarbon well of D1, where the coke proppant particles comprise at least one of fluid coke, flexicoke, delayed coke, thermally post-treated coke, pyrolysis coke, and coal-derived coke.

D3. The hydrocarbon well of D1 or D2, where the coke proppant particles comprise microproppant coke particles.

D4. The hydrocarbon well of any of D1 to D3, where the hydrocarbon well further comprises second proppant particles that do not comprise coke within at least a portion of the hydraulic fractures.

D5. The hydrocarbon well of any of D1 to D4, where the new production casing string comprises new stages that are of a greater length than pre-existing stages of the pre-existing production casing string.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A method, comprising:
(I) providing a subterranean formation that has been previously hydraulically fractured and produced a fluid through a completed well comprising a wellbore; and
(II) after step (I), injecting, via the wellbore, a fracturing fluid comprising a carrier fluid and coke proppant particles into the subterranean formation to restimulate the subterranean formation.

2. The method of claim 1, wherein the coke proppant particles are present in the fracturing fluid at a concentration from 14 kilograms per cubic meter to 480 kilograms per cubic meter, based on the volume of the carrier fluid.

3. The method of claim 1, wherein the coke proppant particles are present in the fracturing fluid at a concentration from 18 kilograms per cubic meter to 120 kilograms per cubic meter, based on the volume of the carrier fluid.

4. The method of claim 1, wherein the coke proppant particles are present in the fracturing fluid at a concentration from 23 kilograms per cubic meter to 96 kilograms per cubic meter, based on the volume of the carrier.

5. The method of claim 1, further comprising, after step (II):

(III) producing a product fluid from the subterranean formation via the wellbore.

6. The method of claim 5, wherein the product fluid comprises hydrocarbons.

7. The method of claim 1, wherein step (II) comprises injecting the fracturing fluid into pre-existing fractures in the subterranean formation.

8. The method of claim 7, wherein step (II) comprises at least one of:

extending at least one dimension of at least one of the pre-existing fractures; and reopening at least one of the pre-existing hydraulic fractures that has at least partially closed before step (II).

9. The method of claim 1, wherein step (II) is performed via a bullhead refracturing method.

10. The method of claim 1, wherein step (II) comprises:

(II.1) creating new perforations in at least a portion of the wellbore; and (II.2) injecting the fracturing fluid through the new perforations into the subterranean formation.

11. The method of claim 10, wherein in step (II.1), the new perforations are created through a pre-existing production casing string of the wellbore without installing a new casing string inside the pre-existing production casing string.

12. The method of claim 10, wherein step (II.1) comprises:

(II. 1.1) installing a new production casing string in a pre-existing casing string of the wellbore to isolate pre-existing perforations in a pre-existing production casing string of the wellbore; and (II. 1.2) creating new perforations through the new production casing string and the pre-existing casing string.

13. The method of claim 12, wherein in step (II.2), a stage length during a hydraulic fracturing operation is larger than a stage length during a previous hydraulic fracturing operation performed previously before step (II).

14. The method of claim 1, wherein step (II) is performed by utilizing at least one diversion material to direct a flow of the fracturing fluid within the wellbore.

15. The method of claim 14, wherein the at least one diversion material comprises at least one of a bridge plug, a packer, a downhole valve, a sliding sleeve, a baffle/plug combination, a ball sealer, sand, a ceramic material, salt, a wax, a resin, a viscosified fluid, a gelled fluid, and a foam.

16. The method of claim 1, wherein step (II) is carried out using a limited entry method designed to provide a pressure drop of at least 2,000 psi across a wall of a casing string from within the wellbore.

17. The method of claim 1, wherein the coke proppant particles comprise at least one of:

fluid coke;

flexicoke;

delayed coke;

thermally post-treated coke;

pyrolysis coke; and coal-derived coke.

18. The method of claim 1, wherein the coke proppant particles comprise microproppant coke particles.

19. The method of claim 1, wherein step (II) is performed one stage after another.

20. The method of claim 19, wherein step (II) comprises:

injecting the fracturing fluid during an early phase of a hydraulic fracturing operation; and injecting a second fracturing fluid comprising a carrier fluid and second proppant particles that do not comprise coke into the subterranean formation during a later phase of the hydraulic fracturing operation.

21. The method of claim 19, wherein step (II) comprises:

injecting a second fracturing fluid comprising a carrier fluid and second proppant particles that do not comprise coke into the subterranean formation during an early phase of a hydraulic fracturing operation; and injecting the fracturing fluid during a later phase of the hydraulic fracturing operation.

22. The method of claim 1, wherein the fracturing fluid further comprises second proppant particles that do not comprise coke.

23. The method of claim 1, wherein the carrier fluid comprises water.

24. The method of claim 1, wherein the carrier fluid is substantially free of water.

25. The method of claim 1, wherein the fracturing fluid further comprises at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

26. The method of claim 1, wherein step (II) comprises reopening and/or extending at least a portion of pre-existing fractures in the subterranean formation that have fully or partially closed due to proppant embedment and/or proppant degradation prior to step (II).

27. The method of claim 1, wherein in step (I), the subterranean formation has been previously hydraulically fractured using proppants free of coke proppants.

28. The method of claim 1, wherein step (II) is carried out using an extreme limited entry method designed to provide a pressure drop of at least 3,000 psi across a wall of a casing string from within the wellbore to the outside of the wellbore.

* * * * *